United States Patent
Opitz

[19]

[11] Patent Number: 6,133,922
[45] Date of Patent: Oct. 17, 2000

[54] METHOD OF INTEGRATING A BLEND OR CHAMFER SURFACE REPLACING AN EDGE OF A GEOMETRICAL BODY INTO A SOLID MODEL

[75] Inventor: Karsten Opitz, Tuebingen, Germany

[73] Assignee: Hewlett-Packard Company, Palo Alto, Calif.

[21] Appl. No.: 08/933,218

[22] Filed: Sep. 18, 1997

[30] Foreign Application Priority Data

Oct. 17, 1996 [EP] European Pat. Off. .............. 96116708

[51] Int. Cl.[7] ................................... G06T 17/00
[52] U.S. Cl. .................... 345/420; 345/434; 345/435; 345/433
[58] Field of Search ................... 345/419, 420, 345/433, 434, 435; 700/98

[56] References Cited

U.S. PATENT DOCUMENTS

| | | | |
|---|---|---|---|
| 5,353,390 | 10/1994 | Harrington | 345/420 |
| 5,615,317 | 3/1997 | Freitag | 345/419 |
| 5,649,084 | 7/1997 | Ernst | 345/435 |
| 5,847,956 | 12/1998 | Bronfeld | 364/468.04 |
| 5,859,786 | 1/1999 | Klein | 364/578 |

*Primary Examiner*—Mark K. Zimmerman
*Assistant Examiner*—Motilewa Good-Johnson

[57] ABSTRACT

In a method of integrating a blend or a chamfer surface replacing an edge of a geometrical body into a solid model, a primary blend or chamfer surface is defined and the primary boundaries between the primary surface and the body are calculated. Then the primary boundaries are trimmed and edges adjacent to the edge to be replaced will be removed if the edges are determined to be obsolete, thus leaving the body in a geometrically inconsistent state. Further, a new primary blend or chamfer face is created on the basis of the primary surface by substituting the edge to be removed by new edges forming a new boundary of the new primary face. For each vertex of the edge to be removed, it is checked whether the body is geometrically inconsistent around the vertex and if this is the case the geometry of the body will be trimmed around the vertex by collecting all gaps of the primary face wherein a gap is defined by topologically adjacent edges which do not fit geometrically. For each gap a trimming path consisting of a sequence of curve segments becoming a part of the face is calculated and a new topology is created. Then all gaps on secondary, non-blend or non-chamfer surfaces around the vertex are collected and the calculation of a trimming path and the creation of topology is repeated for all secondary faces of the body.

9 Claims, 25 Drawing Sheets

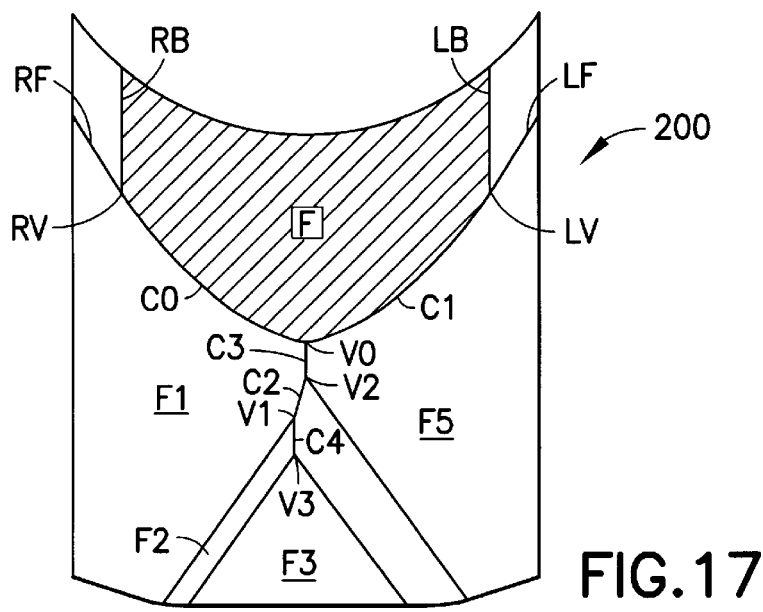
FIG.17
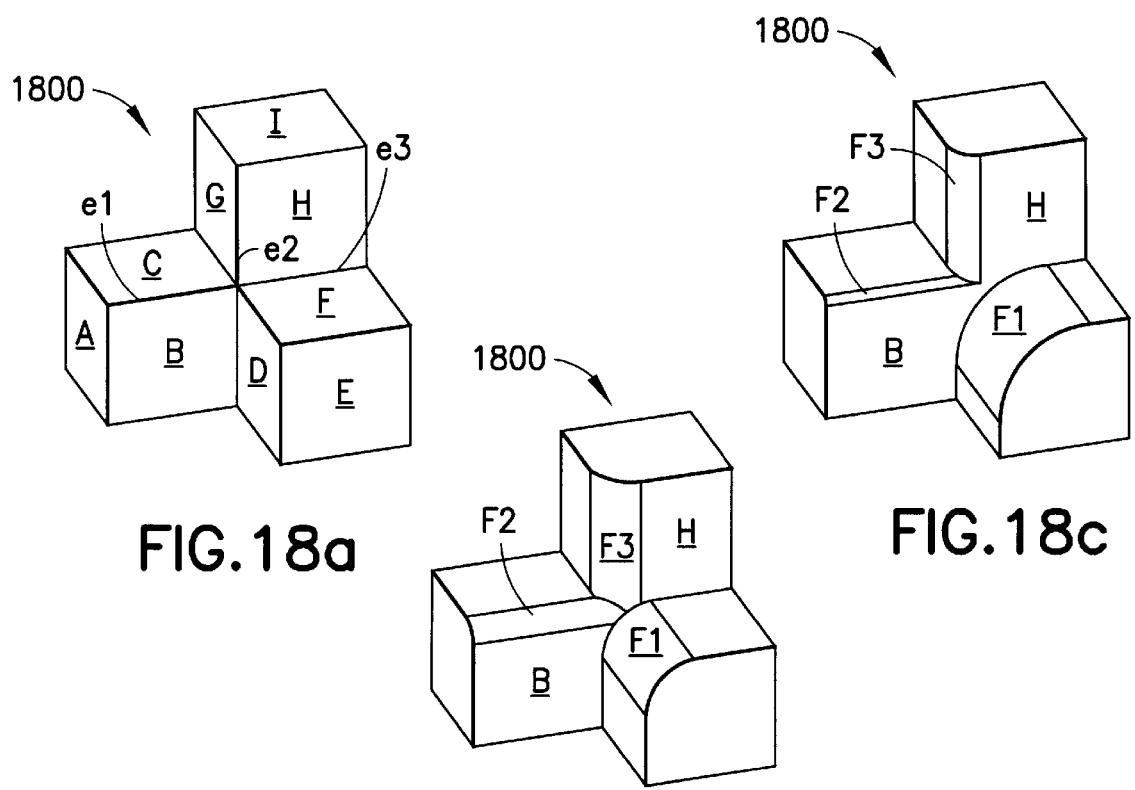
FIG.18a
FIG.18b
FIG.18c

METHOD OF INTEGRATING A BLEND OR CHAMFER SURFACE REPLACING AN EDGE OF A GEOMETRICAL BODY INTO A SOLID MODEL

FIELD OF THE INVENTION

The present invention relates to a method of integrating a blend or chamfer surface replacing an edge of a geometrical body into a solid model of the body in a computer-aided design system (CAD system). In the design of physical objects, for example machine parts, it is often necessary to blend or chamfer edges of the object. The present invention deals with the performance of the blending or chamfering operation in a 3D-CAD system which is capable of storing a graphical representation of a physical object and displaying it three-dimensionally in an isometric view and which allows an user to modify this representation interactively.

BACKGROUND OF THE INVENTION

CAD systems are widely used in the design of mechanical or electronic parts or other objects and there are several commercially available systems of that type. A common characteristic of all these systems is that the objects are designed by the user in an interactive mode, that is the body is displayed on a screen as far as it has been designed by the user and the user can enter commands to apply modifications and/or additions to the already existing structure.

For displaying the geometric object under design, typically a cathode ray tube (CRT) or a liquid crystal display (LCD) is used. The object is displayed in an isometric view. Additionally, the displayed object can be illuminated by computer generated light sources to yield realistic three-dimensional images. The commands for supplementing or modifying are entered by suitable input means, preferably a computer mouse, a graphic tablet or a light pen. As an alternative to the perspective representation on the screen, a two-dimensional or cross-sectional view of the object under design can be displayed. Some known CAD systems also allow to rotate the displaced object around different axes so that the user can look at the object from several directions. When the editing process is finished and the object to be designed has assumed its final shape, a corresponding hard copy can be produced by means of a printer or a plotter. Furthermore, a punched tape or a magnetic tape can be produced from the data representing the object, and this tape can then be used directly by a numerically controlled machine tool for manufacturing the desired physical object.

An example of a commercially available 3D-CAD system is the Hewlett-Packard precision engineering solid designer 4.0 which belongs to the class of the so-called "boundary representation" modelers (B-rep modeler) which represent a solid model indirectly through its boundary surfaces. In addition to the geometric information, a B-rep modeler stores additional topological information which describes adjacency relationships between the geometric entities. Other classes of modelers most commonly used are based on the "constructive solid geometric approach" (CSG approach) where a solid model is represented as the result of a sequence of basic operations such as union or intersection applied to simple geometric objects. A more detailed description on the representation schemes, in particular on B-rep models, can be found in Mantyla M. "An introduction to solid modelling", Computer Science Press, Rockville 1988.

The major advantage of the B-rep scheme is the fact that it is well suited for local modifications of the model, most notably the process of blending or chamfering an edge. In this case, a sharp edge of a solid model is replaced by a surface which either connects the adjacent faces smoothly (blending) or in a flat manner (chamfering). Both operations, in particular the blending of edges serve several purposes in mechanical designs, including dissipating stress situations and enhancing fluid flow properties. The reliability of the blending operation is therefore often crucial for the completion of an entire design in a 3D-CAD system.

In the following, several types of blending and chamfering operations will be described in more detail with reference to FIG. 20 and FIG. 21.

FIG. 20a illustrates in an isometric view a geometrical object 2000 which comprises a plurality of faces 2002, 2004, 2006 which define the shape of the object 2000. Between the respective faces 2002 to 2006 of the object 2000, edges 2008 to 2024 are formed. In the following, one edge of the object 2000 is to be blended. In the example described with reference to FIG. 20, the edge to be blended is edge 2008.

There are several approaches which are used for creating a blend surface between face 2002 and face 2004 of the object 2000. Two of the possible approaches are described now in more detail with reference to FIG. 20b and FIG. 20c. In FIG. 20b the resulting object 2000 is illustrated after the so-called "constant radius rolling ball blend" operation has been applied to the object shown in FIG. 20a. For the sake of clarity, the reference signs defining the unchanged edges of the object are omitted. As can be seen from FIG. 20b, the original edge 2008 has been replaced by a blend surface 2026 which has a first new edge 2028 connecting the blend surface 2026 to the face 2002 and a second new edge 2030 connecting the blend surface 2026 to face 2004. Further, the blend surface 2026 comprises two rounded edges 2032 and 2034. As it is shown in FIG. 20b, the surface area of face 2002 and of face 2004 is smaller when compared with the original surface area disclosed in FIG. 20a of these faces. In other words, the faces 2002 to 2006 shrink.

The blend surface 2026 can be viewed as being generated by a ball moving along the original edge 2008 and touching the adjacent faces 2002 and 2004. The lines at which the ball touches the adjacent faces 2002 and 2004 define the first and the second new edges 2028 and 2030 as shown in FIG. 20b.

With respect to FIG. 20c, a further approach for generating a blend surface is disclosed in more detail. The blend surface 2036 shown in FIG. 20c has been generated by applying a so-called "variable radius rolling ball blend" operation to the object. Other than in FIG. 20b, where the distance between the new first and the new second edges 2028 and 2030 is constant, in FIG. 20c the distance between the respective new formed edges 2038 and 2040 of blend surface 2036 grows from the left-hand side of FIG. 20c towards the right-hand side of FIG. 20c. The blend surface 2036 further comprises the edges 2042 and 2044. These edges 2042 and 2044 are not of the same length.

The blend surface 2036 shown in FIG. 20c can be viewed as being generated by a ball moving along original edge 2008 and touching the adjacent faces 2002 and 2004 wherein during the movement along the edge 2008, the radius of the ball is continuously changed. In other words, FIG. 20c describes a generalization of the basic rolling ball blend operation described with reference to FIG. 20b.

With reference to FIG. 21, different approaches for creating a chamfer surface between adjacent faces of a geometric object are described in more detail. In FIG. 21a, the original object is illustrated in isometric view. The object shown in FIG. 20a is the same as the one shown in FIG. 20a.

Therefore, a description of the object shown in FIG. 21a is omitted. It is noted that the same reference signs are used in FIG. 21 as in FIG. 20.

In FIG. 21b the resulting body after applying the "constant distance chamfer" operation to the body disclosed in FIG. 21a is shown. By applying this operation to the original object 2000, a chamfer surface 2102 between faces 2002 and 2004 is created. The chamfer surface is bounded by a first new edge 2104 and a second new edge 2106 and further by the edges 2108 and 2110. The difference between the face 2102 and the face 2026 of FIG. 20b is that the faces 2002 and 2004 are now connected by a plane surface 2102 which becomes clear from the edges 2108 and 2110 which are straight lines rather than rounded lines as shown in FIG. 20b. In other words, the edge 2008 of the original body 2000 shown in FIG. 21a is replaced by a flat surface 2102 connecting two curves which have the same distance from the original edge 2008, wherein the above two curves are the new edges 2104 and 2106. It is noted that in the example shown in FIG. 21b, the chamfer surface 2102 is not applied under a constant angle to the original face 2008. This means that the angle of the edge 2108 between original faces 2002 and 2004 is different from the angle of new edge 2110 between faces 2002 and 2004.

With reference to FIG. 21c, the object is described which achieved as a result of the application of a "constant distance/angle chamfer" operation to the body of FIG. 21a. The original edge 2008 is replaced by a chamfer surface 2112 which is bounded by the first new edge 2116 and a second new edge 2114. Further, the chamfer surface comprises the edges 2118 and 2120. The difference when compared to the body shown in FIG. 21b is that both edges 2108 and 2120 define the same angle between faces 2002 and 2004. In other words, the chamfer surface 2112 which is bounded by curves 2114 and 2116 on the adjacent faces 2002 and 2004 has a constant distance from the original edge 2008 and cuts the face 2102 at a fixed angle along the curve defined by original edge 2008.

The blending or chamfering of an edge of a body or a geometrical object consists essentially of two major steps which are described in the following with reference to FIG. 22 and FIG. 23. These two figures contain two examples of the creation of a blend surface.

In FIG. 22a, the original object 2200 is shown. This object comprises a plurality of faces F1 to F5 wherein the intersections between respective faces define a plurality of edges e1 to e12. The edge to be blended in the example described with reference to FIG. 22 is edge e12 connecting faces F1 and F5.

The first step is described with reference to FIG. 22b and involves the creation of the blend surface geometry. The step of creating the surface geometry of the blend surface F involves the determination of the geometrical parameters of the blend surface F. As can be seen from FIG. 22b, the blend surface F comprises a first edge E14, a second edge E15, a third edge E16 and a fourth edge E17. It is noted that the edges E16 and E17 are rounded thus defining the convexity of the blend surface F. The creation of the surface geometry of the blend surface F further includes the determination of the position at which the blend surface F intersects the original faces of the original body 2200. In FIG. 22b the respective intersections with the existing faces F1 and F5 are formed by portions of the edges e14 and e15 of the blend surface F and the intersections of the original faces F2, F3 and F4 are indicated by reference signs e18, e19 and e20.

In FIG. 22c, the object is shown which is achieved as a result of the second major step for blending the edge e12 which is the integration of the surface geometry into the solid model. By the integration of the surface geometry to the solid model, original edge e12 is replaced by a blend surface F' which is bounded by the edges e14', e15', e16', e18, e19 and e20. The faces of the body 2200 are smaller when compared to FIG. 22a and are indicated by reference sign F1', F2', F3', F4', F5'. Thus the integration of the blend surface into object 2000 results in shrinking faces.

With reference to FIG. 23, a further example of the creation of a blend surface is described. In FIG. 23a the overall object 2300 is shown. This object 2300 comprises a plurality of faces F1, F2, F3, F4, F5 and F6. At the intersection of the respective faces, the respective edges e1, e2, e3, e4, e5, e6, e7, e8, e9, e10, e11, e12, e13, e14, e15 and e16 are defined.

The edge to be blended according to the example shown in FIG. 23 is edg e e15 between original faces F5 and F6. As already described with reference to FIG. 22b, in a first major step the surface geometry of the blend surface F is created as it is shown in FIG. 23b. For the sake of clarity, the reference signs indicating edges which are not influenced by the blending operation are omitted. The blend surface F comprises four edges e17 to e20 wherein edges e19 and e20 are rounded thus defining the convexity of the surface F.

In FIG. 23c the object is shown after the blend surface was integrated into the solid model. As can be seen, original faces F2 and F4 remain unchanged wherein original faces F1, F3, F5 and F6 have been changed which is indicated by using an apostrophe when indicating the changed surface. The faces F1' and F2' grow, whereas faces F6' and F7' shrink.

It is noted that the mathematics of the geometry creation are well understood and that there exists a vast amount of literature concerning the creation and approximation of the surface geometry of the blend surface, in particular for rolling ball blends. For a more detailed description of the above described two major steps for blending or chamfering an edge of a body, reference is made to Vida J., Martin R. R. and Vardy T. "A survey of blending methods that use parametric surfaces", Computer Design, Volume 5, No. 5, 1994, pages 341–355; Woodwark J. P. "Blends in geometrical modelling" in: The mathematics of surface II, Martin, R. R. (ed.) Oxford University Press, 1987, pages 255 to 297.

The problem of integrating the blend or chamfer surface into the solid model has not yet been solved reliably. The problem consists of adjusting the geometry and topology of the model such that a valid manifold solid which is a manufacturable object results. This process might involve removing existing topological elements, such as edges and faces, of the original body as well as creating new ones.

A known method handles a first type of problem in which topologies are "swallowed" by a new face. An essential feature of this known method is that situations can be handled in which adjacent topological elements always shrink which means that a part of the original edge or face is "cut away" by the new face. As to this point, this known method solves the problem of integrating the surface reliably. This known method is however not capable of handling situations in which existing edges or faces grow. In many practical situations, it is not at all sufficient to only handle shrinking elements as it is quite often the case that several existing topological elements have to "grow" to provide a valid solution. This possibility involves connecting topologies which were entirely separated in the original body as well as creating new elements, such as edges or vertices, between them. This situation will in particular occur when several edges which meet at a vertex are to be blended simultaneously since then every one of the new blend faces grows.

For the case of shrinking topologies, the resulting body can be constructed from intersections with existing elements only. The problem of growing topologies is inherently much more complicated due to the dependencies between geometry and topology. Namely, depending on the geometry to be integrated originally disjoint elements such as faces must be joined or new ones such as edges must be created. Current CAD systems fail to solve this problem satisfactory. Certain special cases of growing topologies are implemented but more complicated ones are not handled reliably. This either leads to a failure of the entire blend operation or chamfer operation or to the creation of a body which is actually not manufacturable by a machine.

SUMMARY OF THE INVENTION

It is the object of the present invention to provide a method of integrating a blend or chamfer surface which reliably handles the case in which topologies grow due to the integration of the blend or chamfer surface.

This object is solved by a method according to claim 1.

The present invention provides a method of integrating a blend or chamfer surface replacing an edge of a geometrical body into a solid model of the body, comprising the steps of:

a) defining a primary blend or chamfer surface;

b) calculating primary boundaries between the primary surface and the body;

c) trimming of the primary boundary;

d) removing edges adjacent to the edge to be replaced if said edges are determined to be obsolete, thus leaving the body in a geometrically inconsistent state;

e) creating a new primary blend or chamfer face based on the primary surface by substituting the edge to be removed by new edges forming a new boundary of the new primary face;

f) for each vertex of the edge to be removed, checking whether the body is geometrically inconsistent around said vertex, if so trimming the topologies of the body around said vertex by carrying out the following steps:

g) collecting all gaps on the new primary face, a gap being defined by two topologically adjacent edges which do not fit geometrically; and for each gap:

h) calculating a trimming path consisting of a sequence of curve segments trimming a part of the face;

i) creating a new topology closing the gap based on the trimming path calculated in step h);

k) collecting all gaps on secondary, non-blend or non-chamfer faces around said vertex; and l) repeating steps h) and i) for the gaps selected in step k) for all secondary faces of the body.

The method according to the present invention which integrates new surfaces into a solid model comprises a few standard steps which temporarily lead to a non-manifold solid with several partially infinite faces. The method according to the present invention then computes the missing boundaries, namely "trims" the infinite portion and integrates the new elements into the model. The method can therefore be applied whereever a simple "hole", namely a hole with only one bounding loop, in a solid model is to be filled. However, the integration of blend or chamfer surfaces in the model is the primary and most important application.

The method according to the present invention is independent of the new surface geometry. It can be applied for constant and variable radius blends as well as all types of chamfer surfaces.

Further, preferred embodiments of the present invention are defined in the dependent claims.

BRIEF DESCRIPTION OF THE DRAWINGS

In the following preferred embodiments of the present invention will be explained in more detail with reference to the drawings.

FIG. 17 illustrates the blended body which is a result of the integration of the blend surface into the body disclosed in FIG. 2a;

FIG. 18 illustrates a further embodiment of the present invention in which a plurality of blend surfaces are simultaneously integrated;

DETAILED DESCRIPTION OF THE INVENTION

Before describing preferred embodiments of the present invention in detail, the terminology for a B-rep solid model as it is used in the following description is summarized below.

A solid model is referred to as "body" which consists of "vertices", "ledges" and "faces". On a manifold body, an edge corresponds to a finite portion of a three dimensional curve bounded by two vertices, and a face corresponds to a finite portion of a face bounded by a sequence of edges. Further, there exist exactly two neighbouring faces of a manifold edge.

The modeler, namely the CAD system, stores the geometric and topological information describing the body and it provides a mechanism to "visit" all elements of a solid model, for example to "visit all faces" of the body and attach additional information to every element. For example, a blend surface can be marked specially. Together these mechanisms are used to extract subsets of elements of the body, for example "visit all blend surfaces" of the body.

Topological modifications of a body are typically performed by the so-called Euler operators which ensure a topologically valid model. For example, when referring to "removing an edge" this means that the Euler operator KEV (kill edge vertex) is applied to the model. When referring to the term "adding an edge and a face" this means that the Euler operator ADEF (add edge face) is applied to the model. For more details concerning the Euler operators, reference is made to Mantyla, M. "An introduction to solid modelling", Computer Science Press, Rockville, 1988.

To provide a short overview of the operation of the method according to the present invention, reference is made to FIG. 1 in which an object is illustrated into which a blend surface is integrated. The object illustrated in FIG. 1 is an example which comprises all possible cases which might occur during the integration of a blend surface into an original object, namely the shrinking of faces, the growing of faces and the swallowing of original faces by new faces.

Figure 1A:
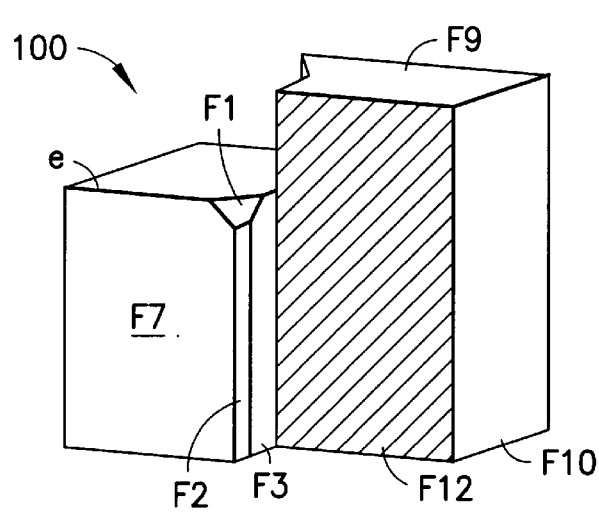
FIGS. 1a–d show a geometrical body illustrating the effects of a complex blend operation leading to shrinking, vanishing and growing adjacent faces.
Figure 1B:
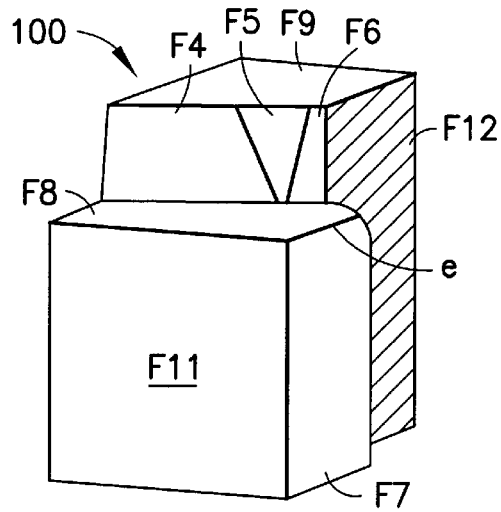

FIG. 1a is an isometric view of the object 100 viewed from a first direction. FIG. 1b is an isometric view of the object 100 viewed from a second direction. As can be seen from FIGS. 1a and 1b, the object 100 has quite a complex shape which is defined by the faces F1 to F12. The edge which is to be blended is indicated by the reference sign e. For the sake of clarity, reference signs indicating the remaining edges have been omitted.

Figure 1C:
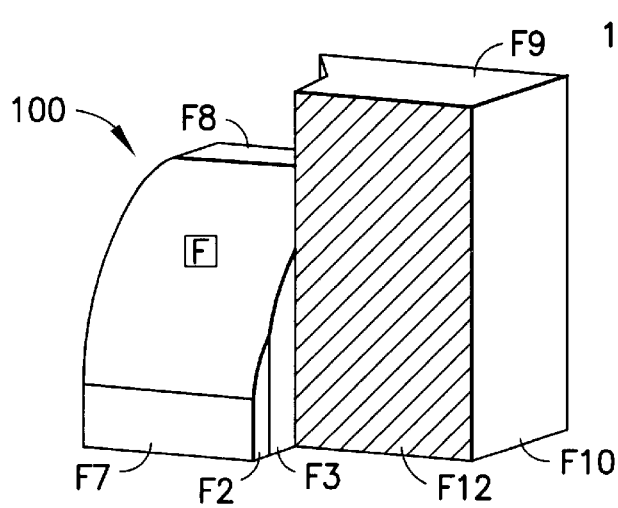
Figure 1D:
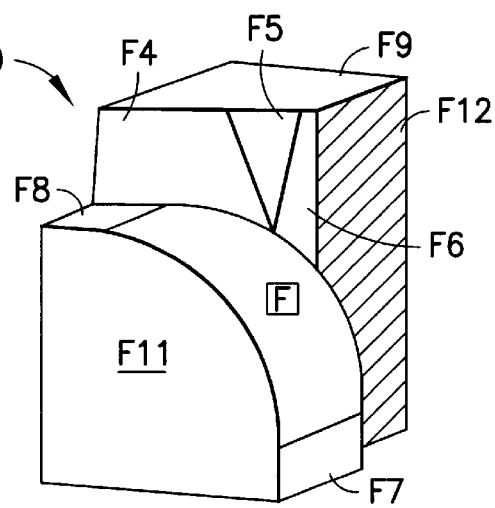

In FIGS. 1c and 1d, the object 100 is illustrated after the completion of the method according to the present invention. Again FIG. 1c is an isometric view of the object 100 as viewed from the first direction and FIG. 1d is an isometric view of the object 100 as viewed from the second direction.

As can be seeen from FIG. 1, the integration of the blend surface F has different effects on different faces of the original body. To be more specific, the blend surface cuts into faces F2, F3, F7, F8 and F11, i.e. these faces shrink. The face F1 is entirely swallowed by blend surface F. The faces F4, F5 and F6 are growing. Faces F9, F10 and F12 are not effected by integration of the blend surface F.

As mentioned above, prior art CAD systems are not capable of reliably handling the growth of faces which are a result of the integration of the blend surface F. Therefore, in the following description of the preferred embodiments of the present invention, the focus will be on the treatment of growing faces.

The handling of shrinking or vanishing topological elements will only be pointed out when necessary.

In the following, reference will be made to FIG. 2 for describing the first major steps of the method according to the present invention.

FIGS. 2a to 2i are perspective views of a body 200 which show the resulting structure of the body after the respective steps are carried out.

Figure 2A:
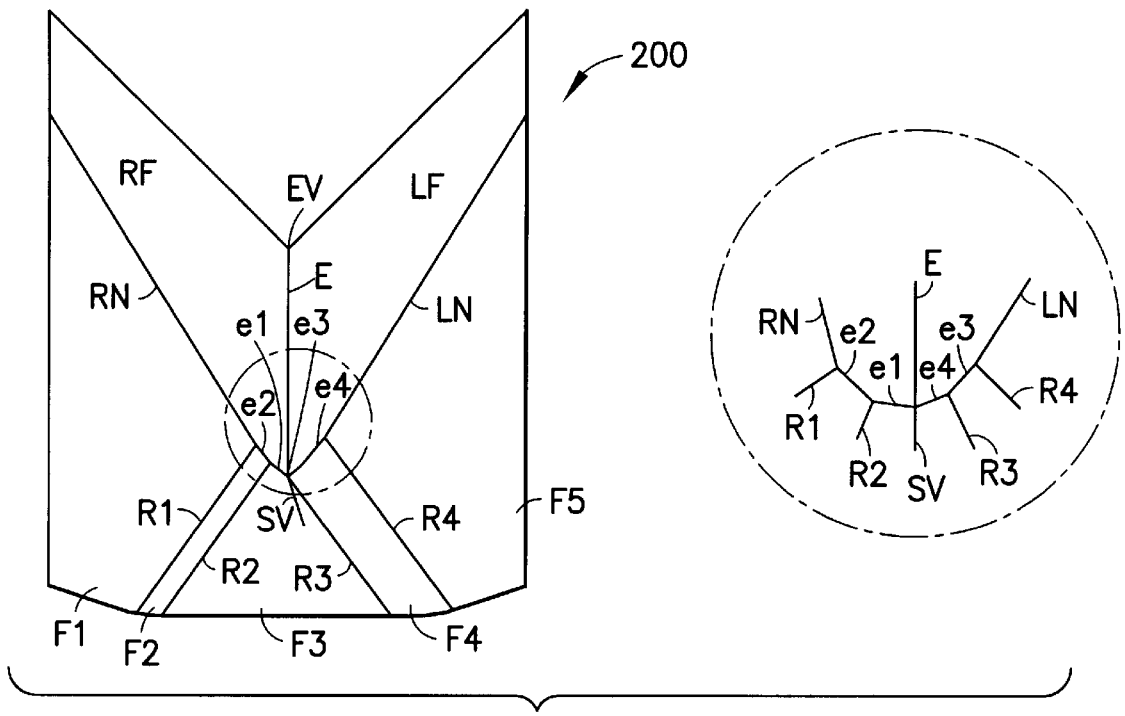
FIGS. 2a–i illustrate the first steps for integrating a blend surface into a body.

In FIG. 2a, the original body 200 is shown. The body 200 comprises a plurality of faces F1 to F5 and RF and LF. The respective faces are surrounded by edges R1 to R4, RN, LN, e1 to e4 and E. For the sake of clarity the outer edges being not influenced by the integration of the blend surface around edge E are not provided with reference signs. In the embodiment described with reference to FIG. 2, the edge E to which the face RF and LF are adjacent is to be blended by integrating a blend surface according to the method of the present invention. The edge E to be blended has associated therewith a start vertex SV and an end vertex EV as indicated in FIG. 2a. On the right-hand side of FIG. 2A, the encircled portion is shown in enlarged scale to clearly indicate the positions at which the edges e1 to e4 are positioned. Although the following description is made with reference to the integration of a blend surface it is clear for a man skilled in the art that the method of the present invention can be equally applied when integrating a chamfer surface.

As it is outlined above, the topological modifications of the body are performed by Euler operators. The modification of the topology by application of the above mentioned Euler operators might however lead to a geometrically inconsistent model. For example, when removing the edge e1 of the body illustrated in FIG. 2a, the remaining edges E, e2 and e3 are "pulled" towards the vertex SV. The geometric points of these edges are however different from the position of SV. Thus, the edges become geometrically inconsistent, namely the topological end point SV is different from the geometric end point.

In the following in the figures the topological state of the handled body will be illustrated. Geometrically consistent edges will be drawn by solid lines, wherein inconsistent edges will be drawn by dashed lines. Since FIG. 2a illustrates the original body, all edges are drawn in solid lines as all are geometrically consistent. As an example, reference is made to FIG. 2h in which the face F is bounded by two dashed edges meaning that the edges do not represent geometric boundaries but just display an intermediate topological state.

With reference to FIGS. 2b to 2h, the replacement of an edge by a blend surface will now be described in detail.

Figures 2B, 2C:
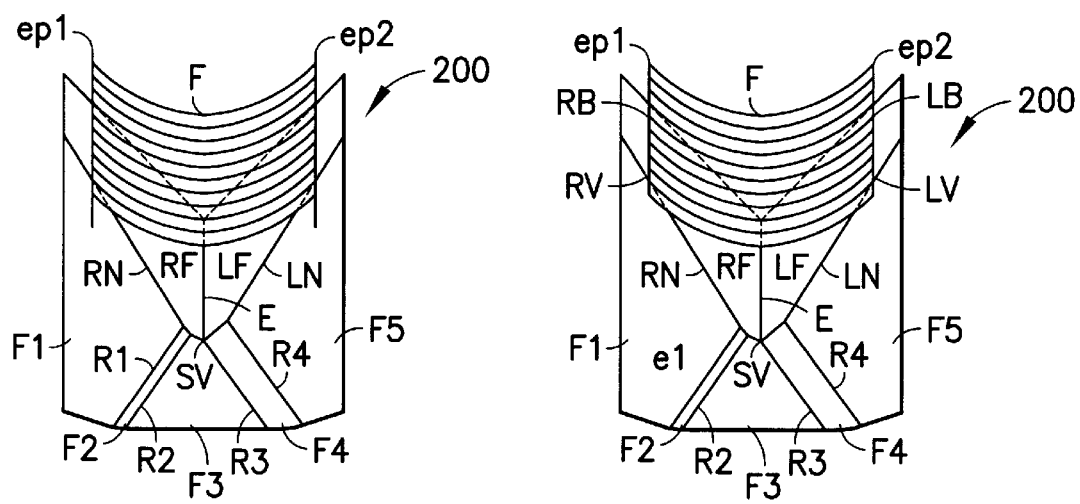

In a first step which is illustrated in FIG. 2b, the blend surface F is geometrically created. This creation includes the calculation of primary boundaries ep1 and ep2 of the blend surface and further the calculation of the blend surface itself. The calculation of the blend surface itself includes the definition of the shape of the blend surface F, for example the convexity, or the like of the surface F. The primary boundaries ep1 and ep2 of the blend surface F are for example created by applying the constant radius rolling ball blend operation to edge E of body 200. The primary boundaries are in this case the touching curves of the rolling ball.

The remaining steps are symmetrically applied to both end points SV and EV of the original edge E to be replaced. In the following only the start vertex SV will be considered.

In a further step illustrated in FIG. 2c, the primary boundaries are trimmed. This trimming of the primary boundaries involves the finding of intersection points RV and LV of the primary boundaries ep1 and ep2 with the edges RN and LN on the faces RF and LF, respectively, which are adjacent to the edge E to be replaced.

Considering the face RF, the routine used for trimming the primary boundaries starts from the start vertex SV and tries to find an intersection of edge e1 (see FIG. 2a) with the primary boundary ep1 of the blend surface F. Since there is no intersection point, the edge e1 is marked and the routine tries to find an intersection with the next edge e2. Again there is no intersection point. Consequently, edge e2 is also marked. The routine then tries to find an intersection point of the next edge which is the edge RN with the primary boundary ep1 of the blend surface F. In this case, there exists an intersection point RV. The same is applied to the opposite face LF, leaving edges e3 and e4 marked and yielding the intersection point LV.

The trimming of the primary boundaries ep1 and ep2 of the surface F results in a first boundary RB of the face F and in a second boundary LB of the face F. Note that the boundaries RB and LB are drawn as bold line in FIG. 2c.

It is noted that the steps described with reference to FIGS. 2b and 2c do not involve any modification of the original body. Up to this point, only the new geometry to be integrated has been determined. Figuratively speaking, the geometry of the blend surface was drawn "on top" of the body as it is shown in FIGS. 2b and 2c.

The steps to be described in the following are actually the ones which involve topological modifications of the original body.

Figure 2D:
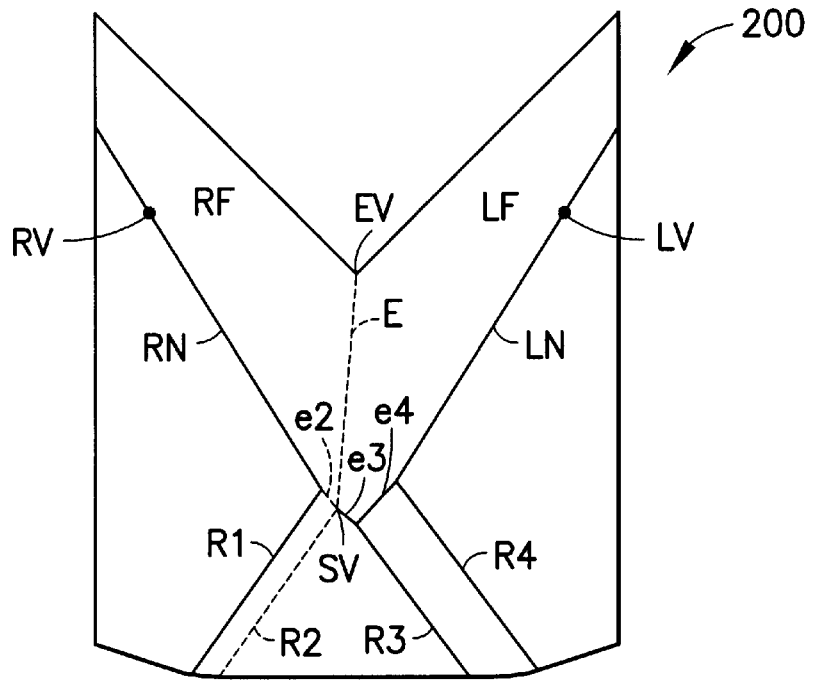
Figure 2E:
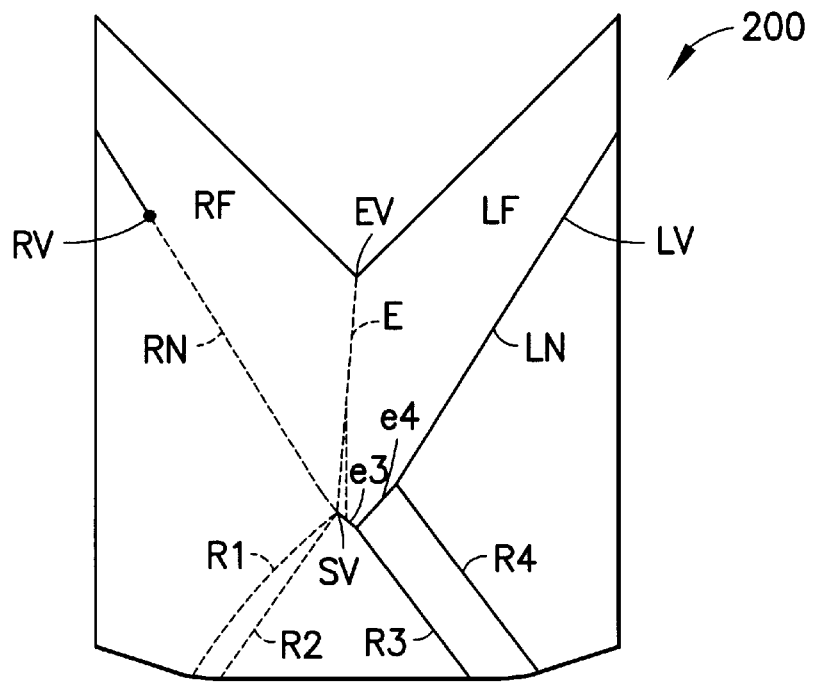
Figure 2F:
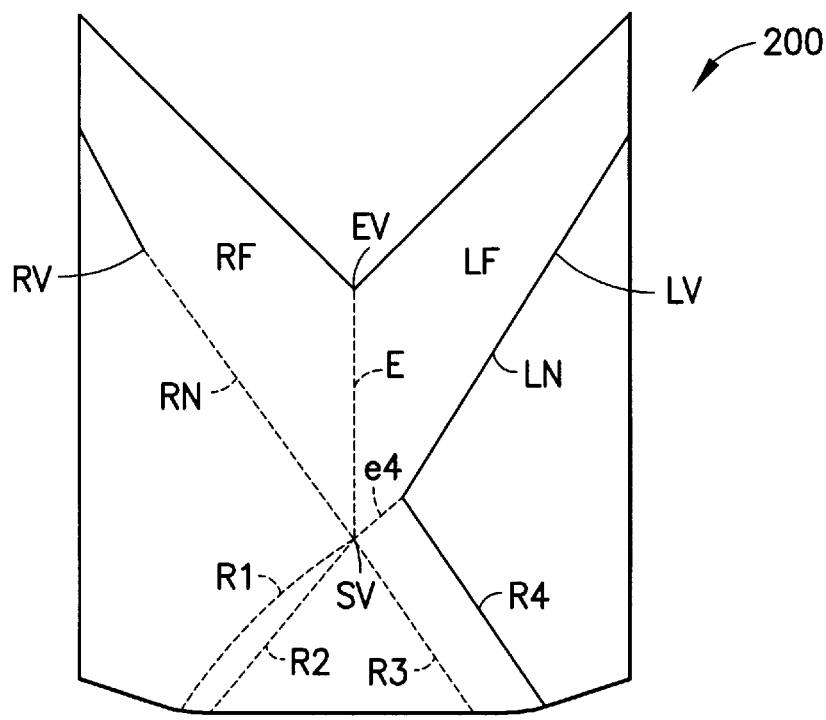

With reference to FIGS. 2d to 2f, the removal of obsolete adjacent edges is described in more detail. All edges which were marked in the previous step described with reference to FIG. 2c, namely all edges lying between edge E and the edges having the intersections RV and LV with the left and right boundary of the blend surface F, namely edges RN and LN, are now removed from the model by application of the Euler operator KEV.

FIG. 2d illustrates the topological state of the body 200 after the edge e1 which was previously marked was removed. Due to the removal of the first edge e1, the edges which had previously an intersection point with the first edge e1 are pulled towards the start vertex SV. The end points of edges R2 and e2 which were previously connected to the edge e1 are now pulled to the start vertex SV. The edges R2 and e2 have now their new end points in the start vertex SV.

FIG. 2e illustrates the removal of the edge e2 which was also marked during the trimming of the primary boundaries of the blend surface F. The resulting body 200 is illustrated in FIG. 2e. By removing the edge e2, the end points of the edges which intersected the edge e2 are moved towards the start vertex as it has been described with reference to FIG. 2d. By removing the edge e2 of the body 200, the end points of edges R1 and RN are moved towards the start vertex SV. It is noted that the edge RN is pulled towards the start vertex SV in such a manner that the intersection point RV of edge RN with the trimmed boundaries of the blend surface F is connected to the start vertex SV, wherein the remaining portion of the edge RN remains unchanged. The reason for this is that the primary boundaries of the blend surface F are provided to determine at which position of the body 200 the blend surface is to start. Areas which are outside the blend surface F that is outside the boundaries of this surface are not to be changed by the integration of the blend surface into the body. Therefore, the portions of the faces RF and LF which are outside the boundaries LB and RB of the blend surface F remain unchanged. Therefore the edge RN is shown only partially as dashed line.

Figure 2G:
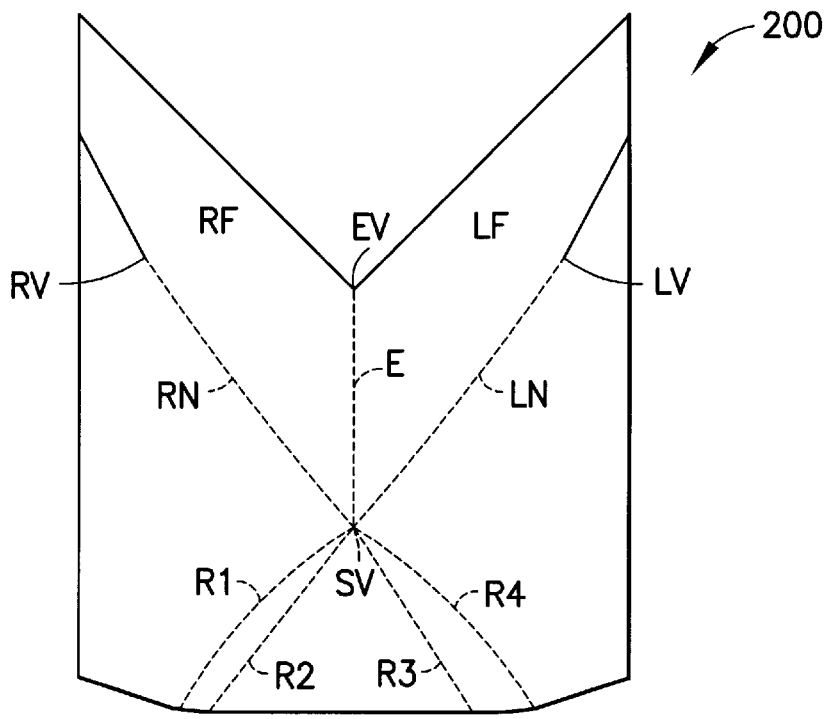

In FIG. 2f, the body 200 is illustrated after the edge e3 was removed. Due the removal of the edge e3 the end point of edge R3 originally connected to edge e3 is pulled towards the start vertex SV. FIG. 2g illustrates the body 200 after the edge e4 has been removed. Due to the removal of edge e4, the end point of edge R4 and the end point of edge LN which were previously connected to the edge e4 are drawn towards to the start vertex SV. In the case of face LN the removal of the edge e4 results in a direct connection of the start vertex and the intersection point LV on edge LN. The remaining portion of edge LN remains unchanged.

FIG. 2g illustrates the body 200 after all edges which were marked during the trimming of the primary boundaries are removed. Due to the removal of the above mentioned edges, all remaining edges now intersect in one point, namely at the start vertex SV. This leaves the body 200 in a geometrically inconsistent state, because none of the edges now intersecting in the start vertex SV intersected in one point in the original body shown in FIG. 2a. For example, according to FIG. 2g, edges R1 and R4 are now intersecting in one point wherein according to FIG. 2a showing the original body, there was no intersection between edge R1 and R4. Therefore, all edges shown in FIG. 2g are shown in dashed lines as they are geometrically inconsistent.

Upon completion of the method according to the present invention the body becomes a topologically and geometrically consistent manifold again.

Figure 2H:
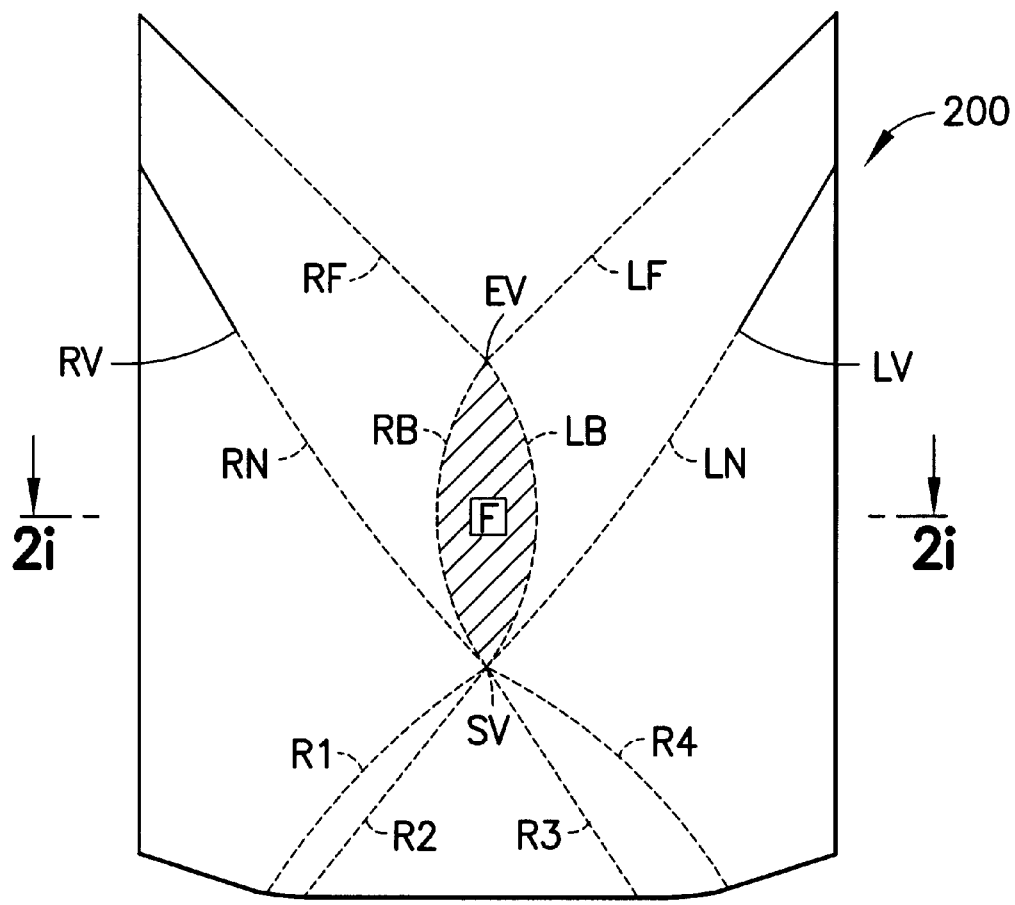
Figure 2I:
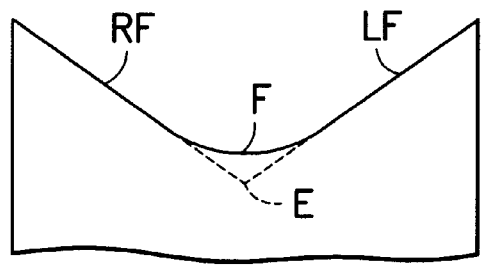

With reference to FIG. 2h, the body 200 is described which achieved after a new blend surface F has been created. In this case, the original edge E (see FIG. 2g) is replaced by a new face F which has a "banana-like" shape. This banana-shape becomes more clear from FIG. 2i which is a cross sectional view of the body 200 along the line 2i—2i. As can be seen from FIG. 2i, the new blend surface F has replaced original edge E and connects the faces RF and LF. The replacement of the original edge E by the new blend surface F is achieved by application of the Euler operator ADEF (add edge face) which creates a new edge, the new face F and updates the data structures accordingly. For the further processing, the newly created face F is also marked as "blend surface".

Although the original blend surface and the original boundary thereof are already associated with the new face F and the new edges RB and LB, respectively, the edges around F as shown in FIG. 2h do not yet represent a geometricaly valid boundary of the face F. By carrying out the steps described above with reference to FIG. 2, the body 200 is left in a state, namely a geometrically invalid state, which requires further steps for achieving a geometrically valid state.

Figure 3:
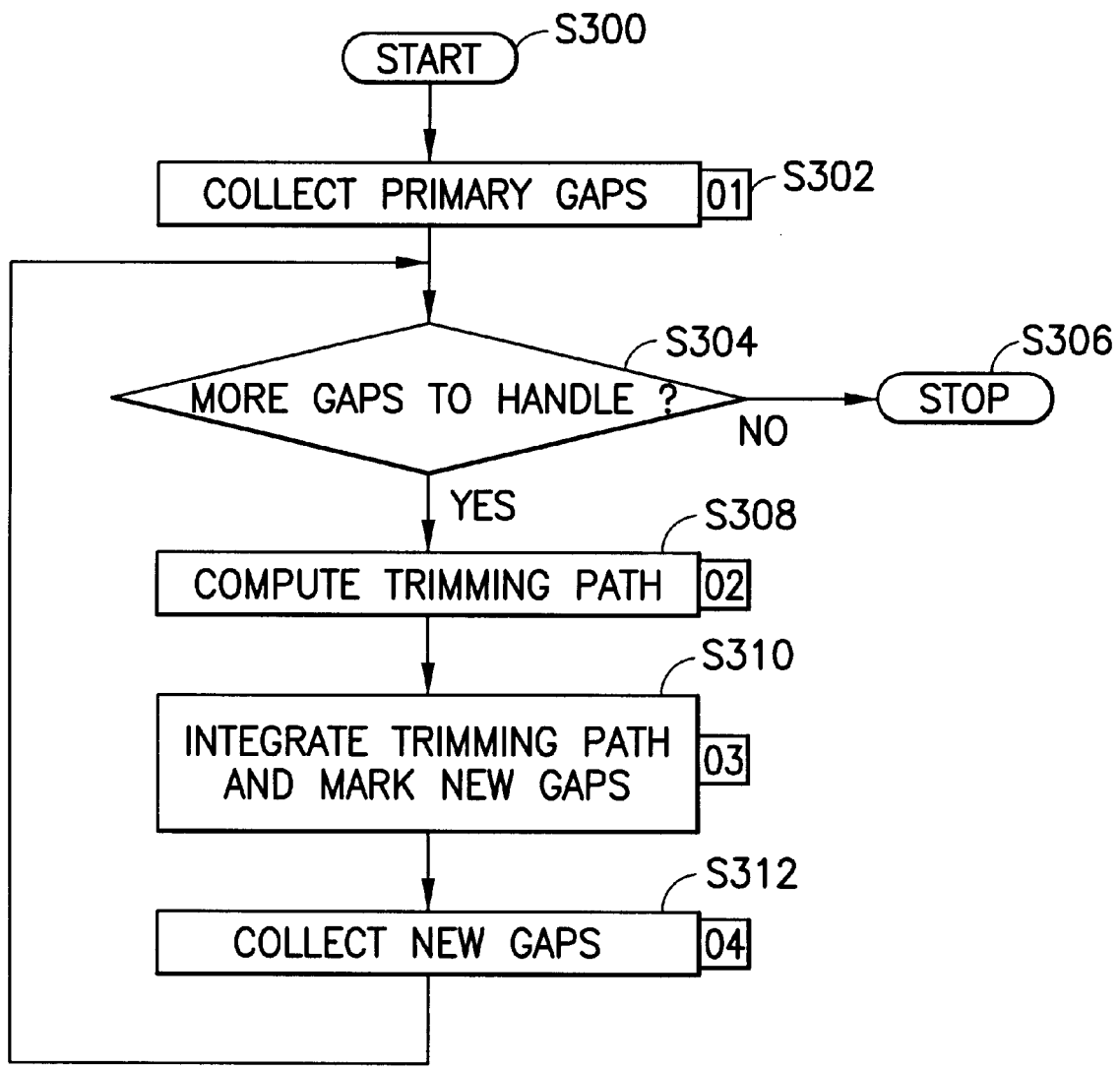
FIG. 3 is a flow chart of the general routine according to the present invention.

This is achieved by applying a general routine to the body. FIG. 3 is a flow chart of the general routine and will be described in the following in more detail.

The routine is entered at step S300. At steps S302 which is also referred to as step O1, the primary gaps are collected. In step S302 all gaps on primary blend surfaces or chamfer faces around a vertex are collected. It is noted that a gap characterized by the fact that two topologically adjacent edges do not fit geometrically, namely the edges are connected to the same vertex but the end points are geometrically different. The step of collecting primary gaps S302 will be described in more detail below. In step S304 it is determined as to whether there exists more gaps to be handled. In case there are no more gaps to be handled, the general routine is left, as it is indicated by step S306. In case it is determined in step S304 that there are more gaps to be handled, step S308 which is also referred to as step O2 of the general routine is carried out. In step S308 a trimming path for the current gap to be handled is computed. The trimming path consists of a sequence of curve segments properly trimming the infinite part of the face. A more detailed description of step S308 will be provided below. At step S310 which is also referred to as step O3 of the general routine, the trimming path calculated in step S308 is integrated and possible new gaps are marked. By means of step S310 a new topology is created which is required to close a gap. The creation of the new topology is based on geometry computed by step S308. A more detailed description will be provided below. In step S312 which is also referred to as step O4 of the general routine, new gaps are collected. By means of step S312 the new gaps which have been marked in step S310 are collected, for example by adding these new gaps to a list containing all gaps. After step S312, the routine returns to step S304.

From the above description of the general routine, it is clear that all steps starting at step S304 are carried out for every gap which has been found in the object.

With reference to FIG. 4, a description of the steps O1 and O4 of the general routine, namely of steps S302 and S312, is made.

Figure 4A:
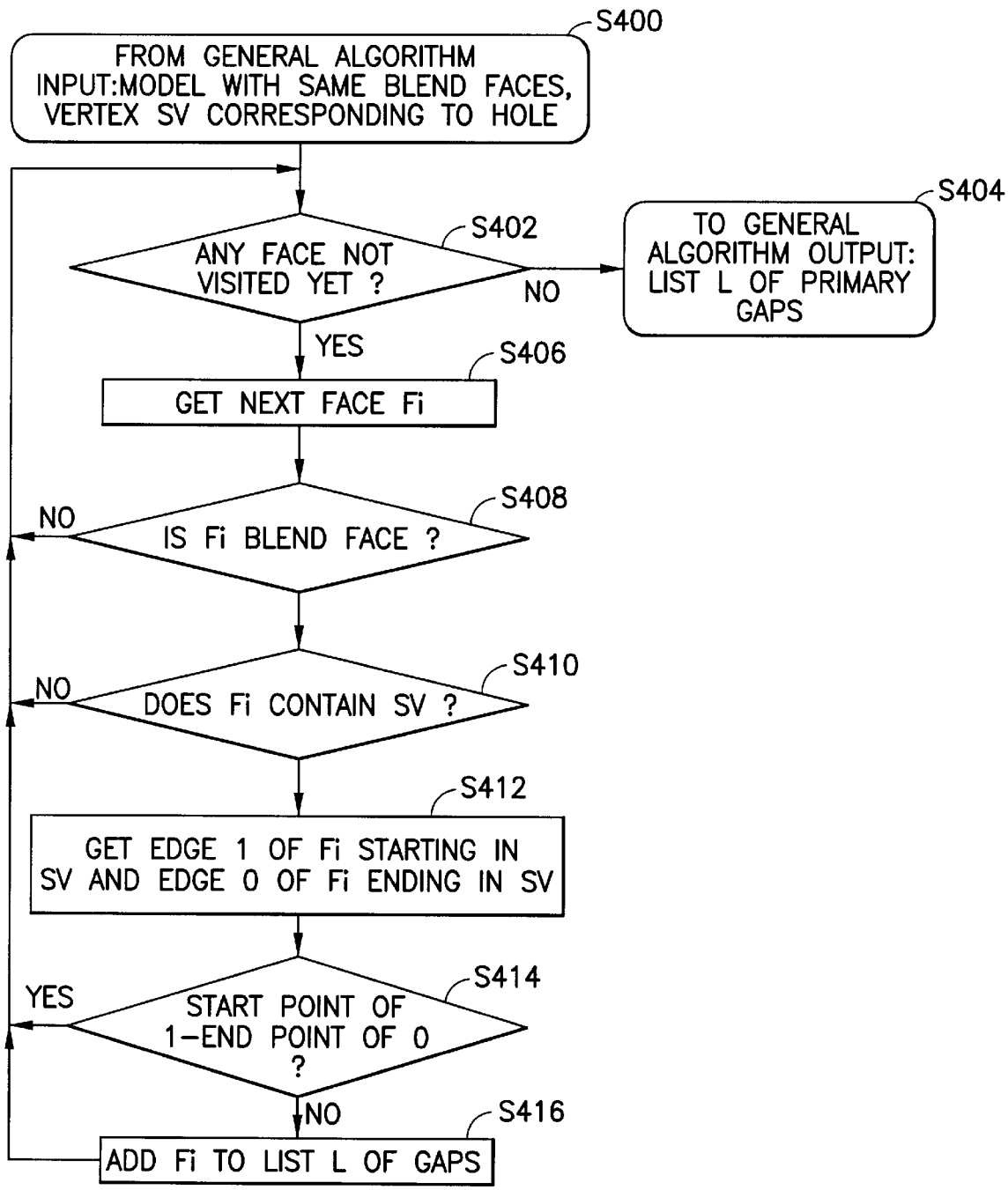
FIG. 4a is a flow chart of step O1 of the general routine.

FIG. 4a describes the step S302 of the general routine in more detail. At step S400, the sub-routine is entered from the general routine. The input for the sub-routine shown in FIG. 4a is the model which comprises some blend faces and further a vertex corresponding to a hole or gap. FIG. 4a relates to an embodiment in which the vertex SV is selected. It is however noted that the sub-routine shown in FIG. 4a is equally applicable to other vertices, such as vertex EV. At step S402, it is checked if there is any face of the model which has not yet been visited. If it is determined at step S402 that all faces of the model has been visited, the sub-routine will end at step S404 and returns to the general routine. Further, a list L of primary gaps which have been collected by means of the sub-routine O1 is output to the general routine. If it is determined in step S402 that there are still faces on the model which have not yet been visited, step S406 will be carried out at which the next face Fi is collected. At step S408 it is determined as to whether the selected face Fi is a blend surface. If the selected face Fi is not a blend surface, the sub-routine will return to step S402. If it is determined in step S408 that the selected face Fi is a blend surface, then the sub-routine will proceed to step S410. In step S410 it is determined as to whether the face Fi contains the start vertex. If this is not the case, the sub-routine will continue at step S402. If it is determined that the face Fi contains the start vertex SV, the sub-routine will continue at step S412. In this step the edge I of the face Fi which starts in the start vertex SV and the edge O of the face Fi which ends in the start vertex SV are determined. At step S414 it is checked as to whether the start point of the edge I equals the end point of the edge O. If this is the case, the sub-routine will return to step S402. If the start point of the edge I is different from the end point of the edge O, at step S416 the face Fi will be added to a list L of gaps. The sub-routine then returns to step S402.

Figure 4B:
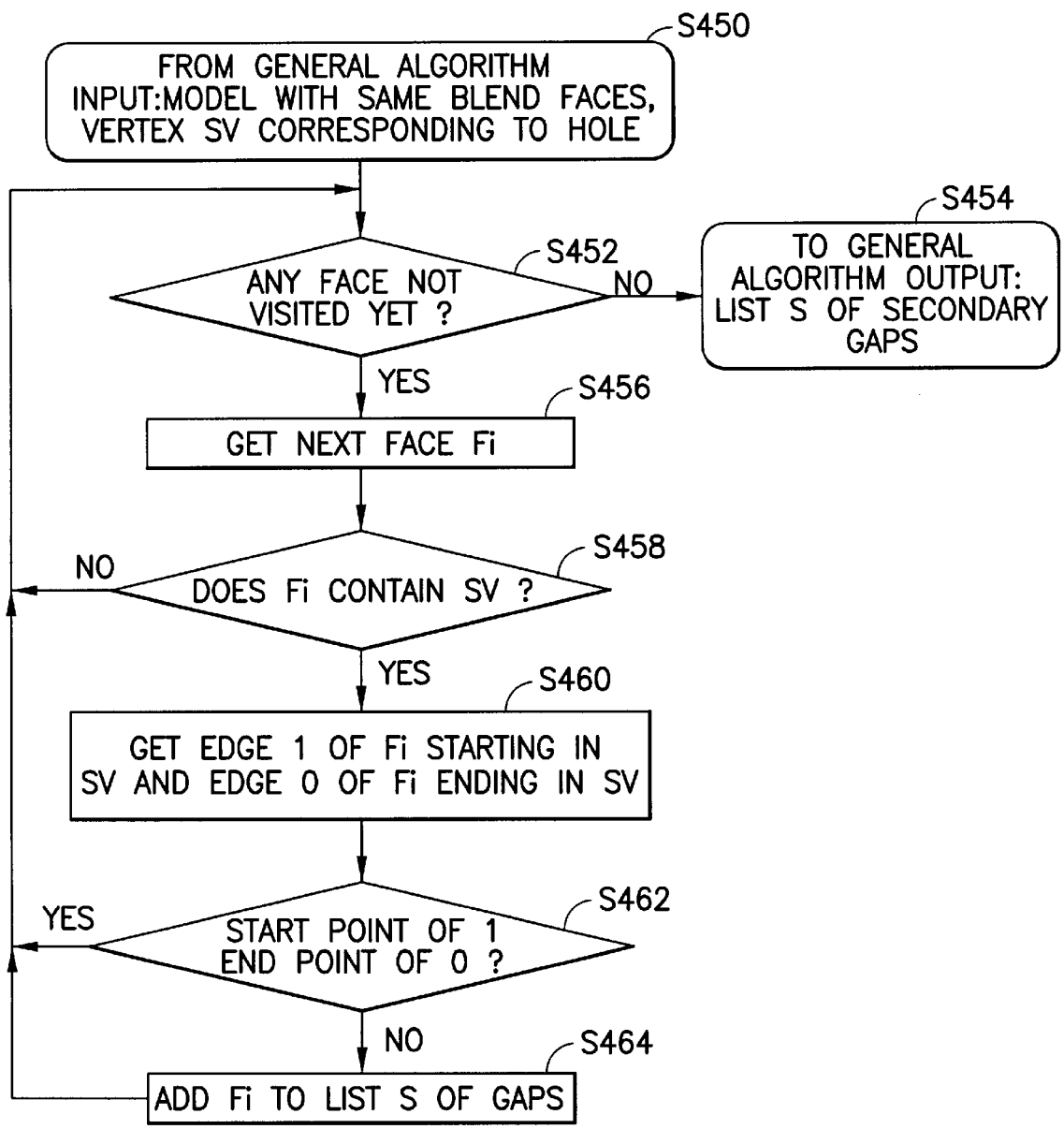
FIG. 4b is a flow chart of step O4 of the general routine.

With reference to FIG. 4b, the sub-routine O4 which collects new gaps is described in more detail. At step S450 the sub-routine O4 is entered from the general routine and the input of the sub-routine O4 is again a model with blend surfaces, a vertex, in the embodiment shown in FIG. 4b, the start vertex SV, corresponding to the hole or gap. At step S452 it is checked as to whether there exists a face which has not yet been visited. If it is determined that all faces of the model are visited, the sub-routine O4 will be left at step S454 and a list S of all secondary gaps will be output to the general routine. A secondary gap is formed on secondary surfaces, i.e. non-blend surfaces. If it is determined at step S452 that there are still faces or at least one face which have not yet been visited, the sub-routine will proceed to step S456 at which the next face Fi is collected. At step S458 it is determined as to whether the face Fi contains the start vertex SV. If this is not the case, the sub-routine will return to step S452. If it is determined at step S458 that the face Fi contains the start vertex, at step S460 the edge I of the face Fi which starts in the start vertex SV and the edge O of the face Fi which ends in the start vertex SV will be determined. At step S462 it is determined as to whether the start point of the edge I is the end point of the edge O. If this is the case, then the sub-routine will return to step S452. If the start point of the edge I is different from the end of the edge O at step S464, the face Fi will be added to the list S of secondary gaps. Then the sub-routine returns to step S452.

Before providing a detailed description of the remaining major steps O2 and O3 of the general routine, the resulting bodies after each iteration of the general routine shown in FIG. 3 is described with reference to FIG. 5. For the following description, it is assumed that the blend surface F has already been correctly integrated into the body 200 with respect to the end vertex EV of the edge E to be replaced. Therefore, the following description will only be made with reference to the start vertex SV.

Figure 5A:
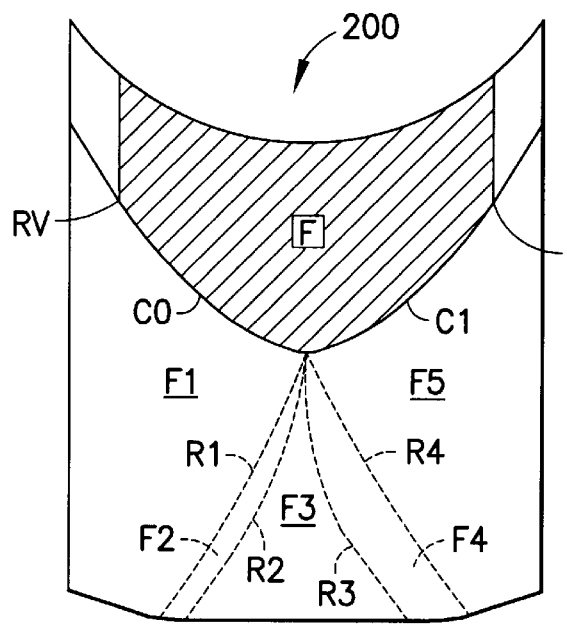
FIGS. 5a–d illustrate the closing of the gaps around the start vertex SV on the respective faces of the body.

In FIG. 5a the body 200 is shown after the step of the general routine in which the primary gaps which are found on the blend surface are closed. In the first step S302 the primary gaps around the start vertex SV are collected and the face F is output from the sub-routine O1 as having a gap. The first iteration of the steps O2 and O3 of the general routine generate a trimming path for the face F and integrate the trimming path for the face F. The integrated trimming path is indicated in FIG. 5a by edges C0 and C1. As can be seen from FIG. 5a, all edges bounding the face F are now geometrically consistent, which is indicated by drawing these edges as solid lines. The remaining edges which are attached to the vertex SV, namely R1, R2, R3 and R4 are not yet geometrically consistent and therefore still illustrated as dashed lines.

At the step O3 of the general routine, the face F1 is marked as having a "secondary gap" and appended to the list of gaps to be processed. By means of the step O4, the face F1 which has been marked in the preceding step is added to the list of secondary gaps as it has been described with reference to FIG. 4b. The next iteration of the general routine computes and integrates the trimming path for face F1.

Figure 5B:
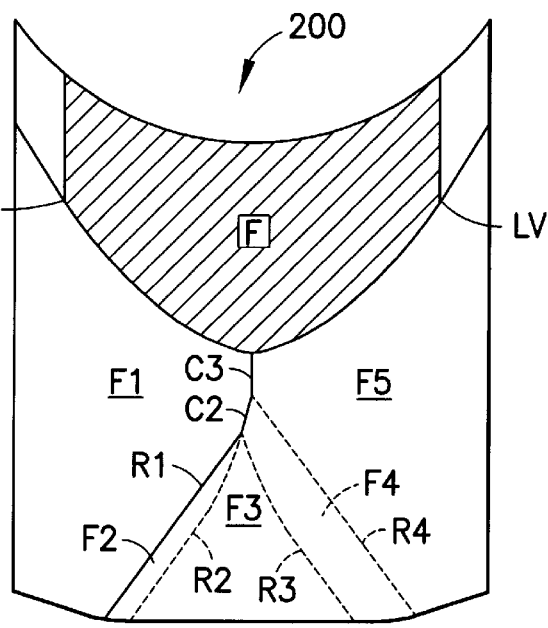

As it is shown in FIG. 5b, the edges C2 and C3 are integrated by the second iteration of the general routine. As indicated by the solid lines, all edges bounding face F1 are now geometrically consistent, whereas the remaining edges R2, R3 and R4 are still not geometrically consistent. In step O3 of the general routine, the faces F2 and F4 are marked as having gaps and added in step O4 to the list of secondary gaps.

Figure 5C:
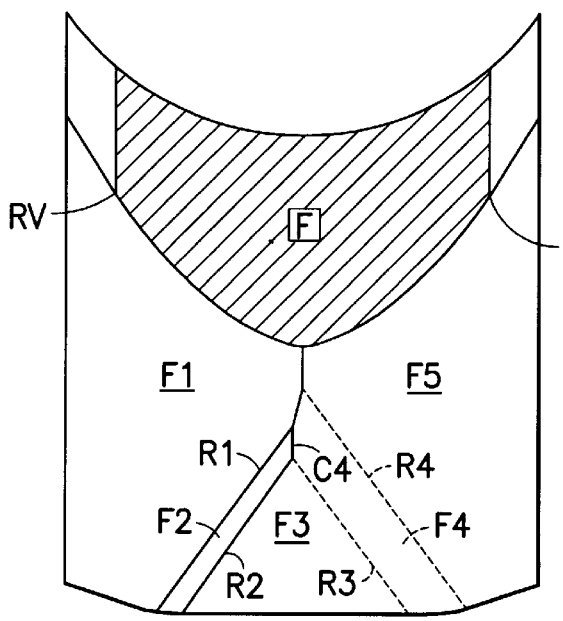
Figure 5D:
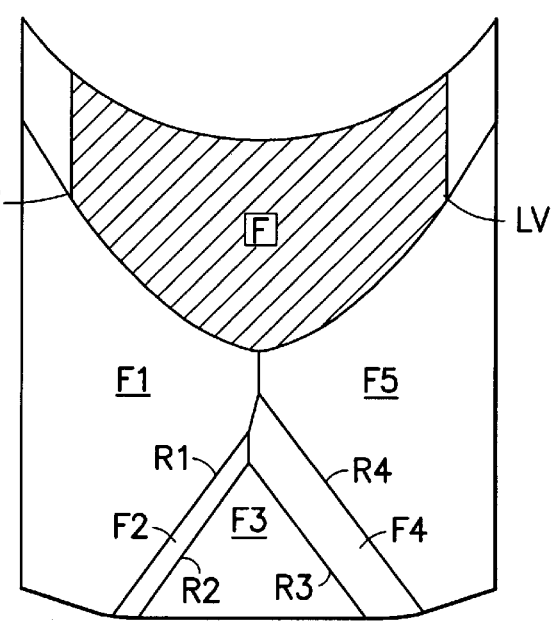

In the third iteration of the steps O2 to O4, the gap on face F2 is closed by creating the new edge C4 as shown in FIG. 5c. In step O3 the face F3 is marked as having a gap and added in step O4 to the list of secondary gaps.

In the final iteration of the general routine, the gaps on faces F3 and F4 are closed. It is noted that the gap on face F5 is not explicitly handled but trimmed as a by-product of closing the surrounding gaps.

In the following the steps O2 and O3 of the general routine will be explained in more detail.

Figure 6:
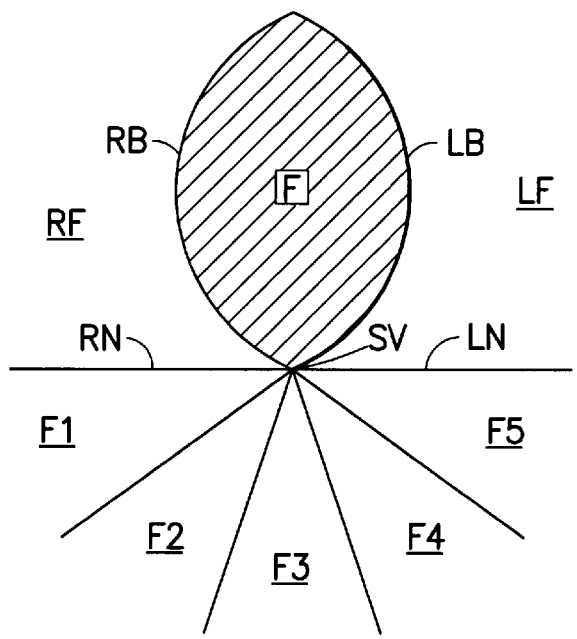
FIG. 6 geometrically illustrates the initial topology around vertex SV.

For a description of the sub-routine O2 of the general routine, firstly reference is made to FIG. 6 which shows the principle topology around the vertex SV of the body shown in FIG. 2h. The topology has a star-like shape around the vertex SV. In the following, the determination of a trimming path for face F will be described. The trimming path will start from edge RB and end at edge LB. It is however noted that it is not at all mandatory to "go from edge RB to edge LB" of face F. The method will work symmetrically if the start point is selected to be the edge LB. This property together with the separation of path finding process and the integration process provides the benefit that in case the routine fails to find a solution starting from the boundary RB, it can be applied again, now starting from boundary LB.

Figure 7A:
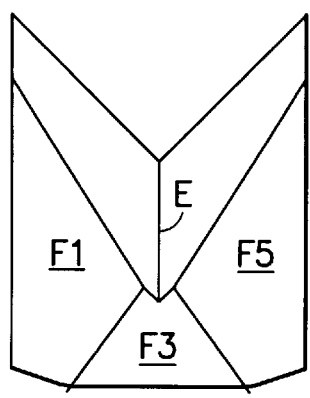
FIGS. 7a–c illustrate an original object and possible solution.
Figure 7B:
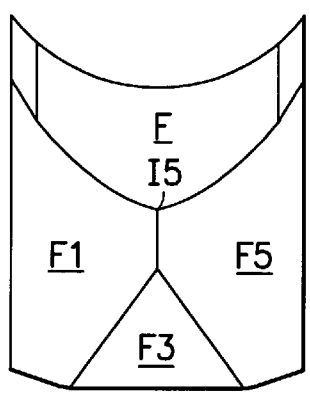
Figure 7C:
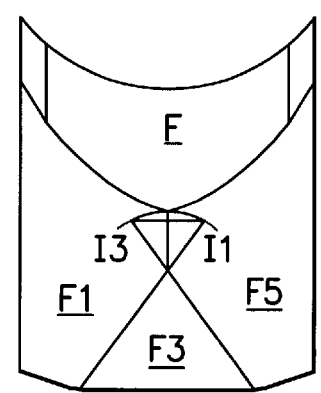

The sub-routine O2 of the general routine computes the trimming path for a face F. The path which will be determined by the step O2 of the general routine consists of pieces of intersection curves of the surface of for example face F (see FIG. 6) with surrounding faces. It is noted that there are several possible paths bounding the face F. With respect to FIG. 7, different solutions for a simplified model are shown. FIG. 7a illustrates the original body in which the edge E is to be blended by integrating a blend surface F. FIG. 7b shows the desired result wherein FIG. 7c shows another solution which yields a non-manifold solid model. This plurality of possible solutions has several reasons. Firstly, there are in general several intersection curves between two faces. Secondly, there are often several intersection points between a curve and a face. Thirdly, and most importantly, in the case of growing topologies, there are several possible faces to intersect with. To illustrate, reference is made to FIG. 5a. Given an intersection curve between face F and face F1, all remaining faces F2 to F5 are possible candidates for the next intersection curve.

Therefore, among possible solutions, the best one leading to a valid solid model must be found. This is achieved by the sub-routine O2 of the general routine illustrated in FIG. 3 which carries out a so-called depth-first search on the tree of all possible solutions. Intuitively, this means that the best solution found so far is followed until either the end point or a "dead end" is reached. In the latter case, the tree is "back tracked" which means that the last segment of the path is ignored and the search is continued with the second best segment.

Before describing a preferred embodiment of the sub-routine O2 of the general routine, the general steps of this sub-routine are described in more detail.

Figure 8:
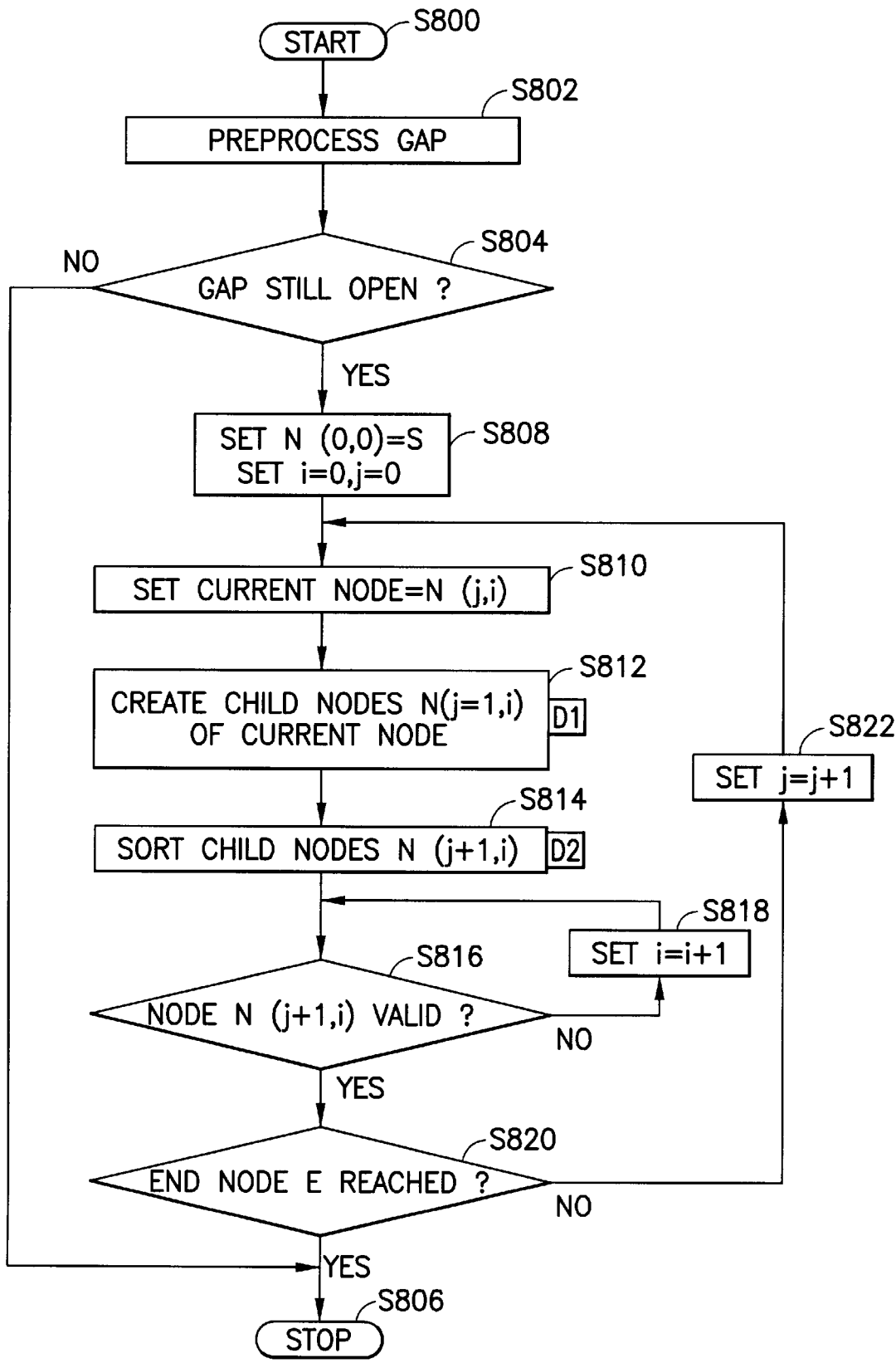
FIG. 8 is a flow chart of the depth-first search routine for finding the trimming path.

FIG. 8 is a flow chart of the sub-routine O2 of the general routine which is used for calculating a trimming path for a face having a gap. The sub-routine is entered at step S800 and proceeds to step S802 at which a preprocessing of the gap is carried out. This preprocessing step will be described in more detail below. At step S804 it is checked as to whether the gap which is to be processed is still open. If the gap is no longer open, the sub-routine will continue as step S806 at which same is stopped and returns to the general routine. In case the gap is still open, the sub-routine proceeds to step S808, a node (0,0) is set to be the starting node or start node S. Further, the index i and the index j are set to 0. A more detailed description of the nodes of the depth-first search tree will be provided below. At step S810 the current node is set to be the node N(j,i). At step S812 child nodes N(j+1,i) of the current node are created. Step S812 will trigger the sub-routine D1 which will be described below. At step S814 the child nodes generated at step S812 are sorted. At step S816 it is determined as to whether the node N(j+1,i) is valid. If this is not the case, the index i will be incremented by one at step S818 and from step S818 the sub-routine returns to step S816. If it is determined at step S816 that the node is valid, it will be checked at step S820 as to whether the end node E is reached. If this is not the case, at step S822 the index j will be incremented by one and the sub-routine returns to step S810. If it has been determined at step S820 that the end node is reached, the sub-routine will stop at step S806 and return to the general routine.

Figure 9:
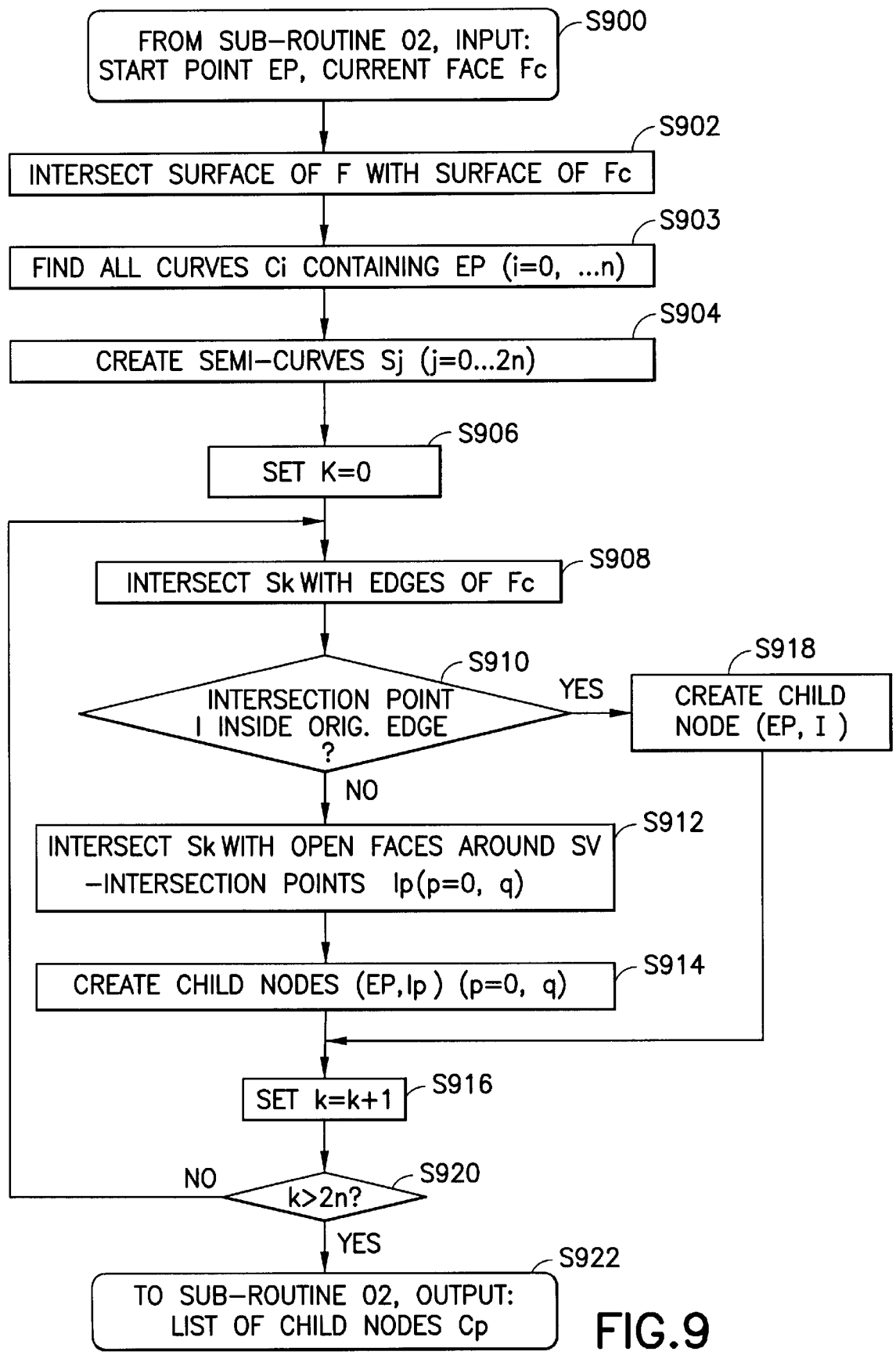
FIG. 9 is a flow chart for creating child nodes for the path tree.

With reference to FIG. 9, the creation of the child node in step S812 is described with more detail. At step S900 the sub-routine D1 creating the child nodes is entered from the sub-routine O2. The input for the sub-routine D1 is the start point EP and a current face Fc. At step S902 the surface of the face F, which the face on which the currently processed gap is found, is intersected with a surface of the current face Fc. At step S903 all curves Ci which contain the end point are determined, wherein i is an index running from 0 to n. At step S904 so-called semi-curves Sj (j=0 . . . 2n) are created. At step S906 an index k is set to 0. At step S908 the semi-curve corresponding to the index k is intersected with the edges of the current face Fc. At step S910 it is determined as to whether there exists an intersection point I inside the original edge of the current face Fc. If there is no such intersection point inside the original edge, the sub-routine D1 will proceed to step S912 at which the semi-curve is intersected with all open faces around the start vertex SV yielding intersection points Ip (p=0 . . . q). At step S914 child nodes are created for each intersection point determined at step S912. Then the sub-routine proceeds to step S916 at which the index k is incremented by one.

In case it is determined at step S910 that there is an intersection point I inside the original edge of the current face Fc, one child node is created at step S918 and the sub-routine continues at step S916.

At step S920 it is checked as to whether the index k is greater than 2n. If this is not the case, the sub-routine D1 will continue at step S908. If step S920 yields that k is greater than 2n, the sub-routine D1 will stop at step S922 and will return to the sub-routine O2. At step S922 a list of created child nodes Cp is output to the sub-routine O2.

Figure 10A:
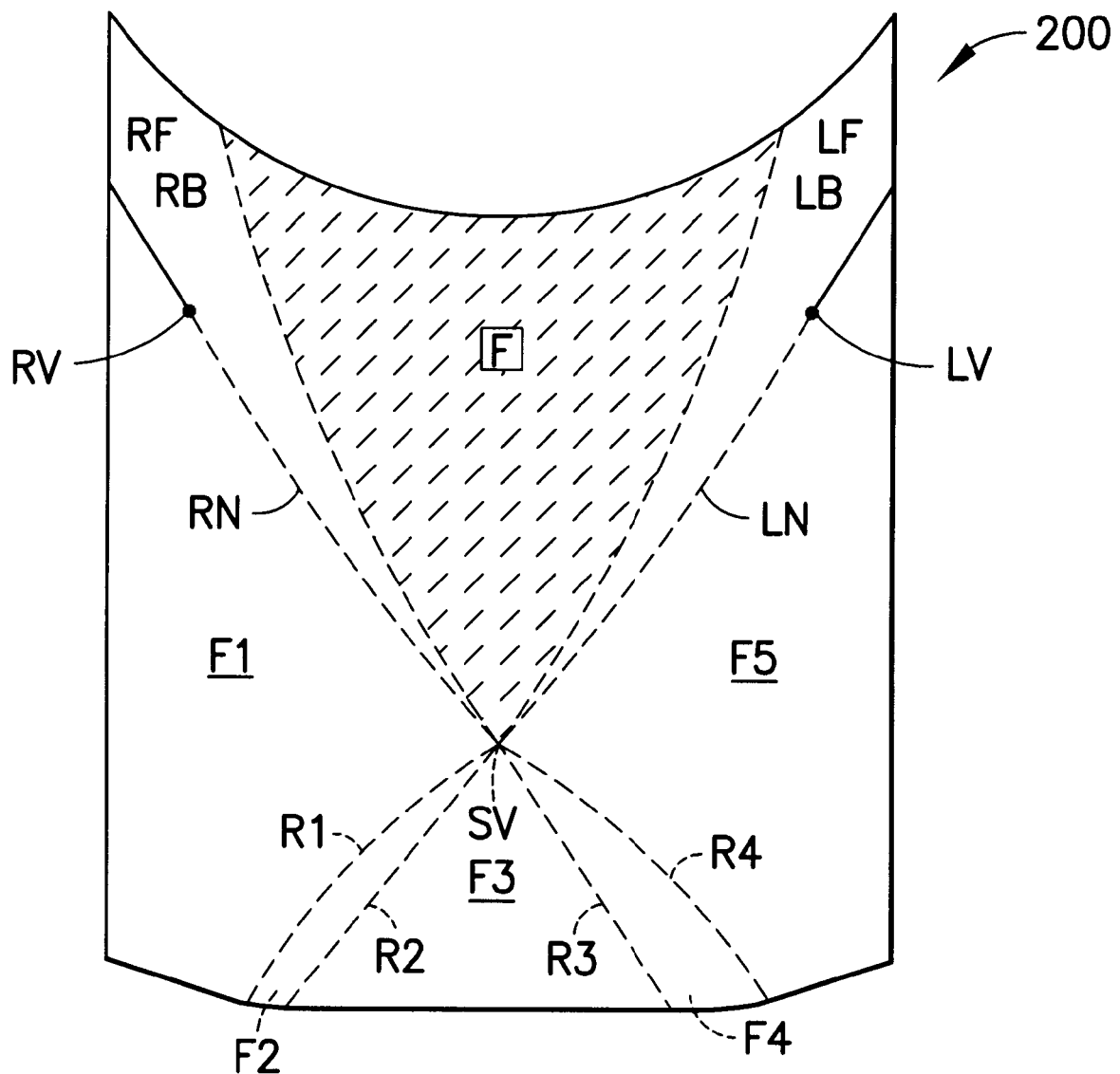
FIG. 10a illustrates the intermediate body after trimming the blend surface around EV with a hole around SV.

In the following a description of a preferred embodiment illustrating the creation or calculation of the trimming path according to the sub-routine O2 of the general routine will be described in more detail with reference to FIG. 10. The following description will be made on the basis of the original body 200 as it is shown in FIG. 2a and which is now in the state as shown in FIG. 2h. Prior to the detailed description of the sub-routine O2, the state of the body 200 is considered in more detail with reference to FIG. 10a. For simplicity, it is assumed that the blend surface F has already been treated around the vertex EV (see FIG. 2a), as it is indicated in FIG. 10a by the solid edges at the back end of the body 200.

Around the start vertex SV, the body is however still geometrically inconsistent as it is illustrated by the dashed lines indicating the edges RN, LN and R1 to R4. For instance, the lines corresponding to edges R1 and R4 in the original body (see FIG. 2a) do not even intersect and therefore cannot have a common vertex in a manifold solid model. This means that around the vertex SV there is a "hole" or a gap in the body 200. More precisely, the faces surrounding the hole are not finite anymore. For instance, the sequence of edges of face F4 have a "gap" between edge R3 and edge R4, namely both the edges R3 and R4 and the face F4 are partially infinite. In order to construct a manifold solid model, these topologies must be "trimmed" to finite portions of the underlying geometry. This final and most complicated operation is carried out by applying the general routine of FIG. 3 to the object 200 shown in FIG. 10a. Firstly the sub-routine O2 for computing the trimming path is described in more detail.

The sub-routine O2 carries out a depth-first search of the tree of all possible solutions. The nodes of the search tree are the curve segments of the paths. The edges which lead into a gap are also considered, that is in the case of trimming the face F, the edges RB and LB (see FIG. 10a) are also considered to be a part of the path. Thus, for filling the gap in face F a start node S is RB and the end node E is LB.

Figure 10B:
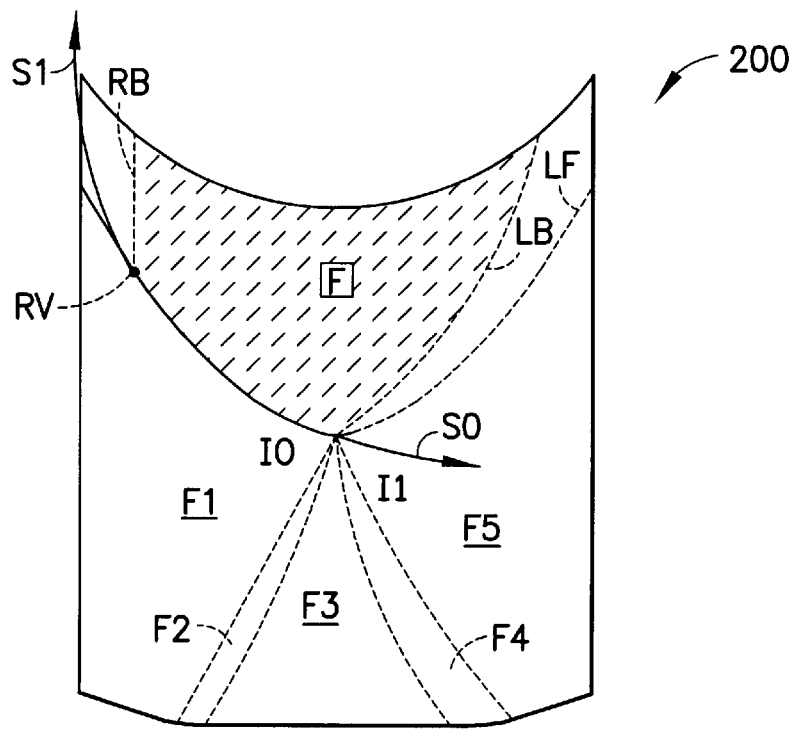
FIGS. 10b–c illustrate the semi-curves for the trimming path on face F.
Figure 10C:
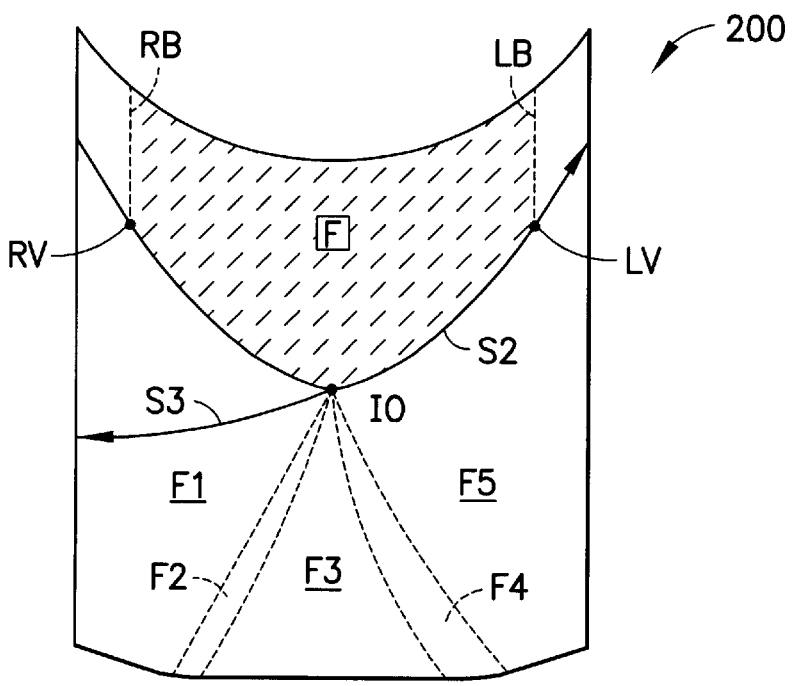

In the preprocessing step (step S802) the end points of the curve segments S and E must be determined. For the face F, these are simply the intersection points RV and LV with the edges RN and LN, respectively, as it is shown in FIG. 10b and 10c. It is noted that once the end point EP which is the intersection point RV of a path node is known, the face carrying the next curve segment is also found. This face which carries the next curve segment is referred to as the current face Fc which is one input parameter of the sub-routine D1 for creating the child nodes as it has been described with reference to FIGS. 8 and 9. In the present case where the gap on the blend surface F is to be closed, the current face Fc which carries the next curve segment is the face F1.

After the preprocessing has been completed, the child nodes are created. For determining the child nodes, all intersection curves between the face F and the face F1 are calculated or computed (step S902) and all curves passing through the end point EP are extracted (step S903). For every curve there are two semi-infinite segments starting at the end point ep with opposite directions. In the following these segments are referred to as semi-curves. For the intersection of the face F and the face F1 there are two such semi-curves which are indicated by the reference sign S0 and S1 shown in FIG. 10b. It is noted that for illustration purposes the edge RB has been moved in FIG. 10b to the position of RV. It is however noted that the steps of the sub-routine 02 are carried out on the body of FIG. 10a.

Before the child nodes corresponding to a semi-curve are created, the end points of these semi-curves are to be determined. For the determination of end points of the semi-curves, these semi-curves are intersected with all existing edges of the face F1 (step S908). For the semi-curve S0, this means that one starts at face F1 and goes clockwise around F1 until either an intersection point I or the edge RN is reached. If an intersection point I inside an original edge of face F1 exists (step S910), a new segment (EP,i) representing a new child node will be determined (S918). For the semi-curve S0 illustrated in FIG. 10b, no such end point exists. The semi-curve S0 is therefore intersected with all open faces attached to the vertex SV not including face F and face F1, namely with faces F2 to F5 (step S912). For the semi-curve S0, this yields the intersection points I0 and I1 with faces F5 and F2, respectively. Every intersection point defines a bounded curve segment and thus there are two child nodes (RV,I0) and (RV,I1) for the semi-curve S0 (step S914). The same process is then applied to the semi-curve S1. This completes the creation of child nodes for the initial node S. The created child nodes are then output to the sub-routine O2 (step S922).

The next step is the sorting of the created child nodes (step S814). Firstly, the group of curve segments lying on the semi-curve is considered. A value based on the angle between the node RV and the semi-curve is assigned to every semi-curve wherein the angle inside the face F is taken. Based on this value, the semi-curves are sorted by assigning the highest priority to the semi-curve with the smallest angle. The sorting is done by a standard routine such as the QuickSort routine. For the intersection between faces F and F1, this yields the order {S0,S1}.

In a second sorting step, the curve segments on every semi-curve are sorted with respect to their length which results in the order {(RV,I0), (RV,I1) . . . segments on semi-curve S0 . . . }. Thus, the next segment for the currently best path is (RV,I0). Since I0 is the intersection point with face F5 (see FIG. 10b), the next segment must be on the intersection between the face F and F5.

Since the end node E is not reached, sub-routine O2 continues at step S810. The sub-routine D1 for creating the child node is again entered and its input is the start point which is now I0 which is the end point of former curve segments and wherein the current face is face F5. Carrying out steps S902 to S904 yields two semi-curves S2 and S3 running through the start point I0, as it is outlined in FIG. 10c. It is noted that the point LV has been moved for illustration purposes only. The semi-curves S2 and S3 are intersected with the edges of face F5. For the semi-curve S2 this means that when starting with edge LN an intersection point is found inside the original edge of face F5, namely the point LV (step S910). Therefore, a single child node exists which is generated by the semi-curve S2 (step S918), namely the segment (I0,LV). By creating the child node generated by semi-curve S2 and by sorting all child nodes, the order {(I0,LV) . . . segments on semi-curve S2 . . . } is achieved.

The node (I0,IV) is the next one which has to be explored. However, the end point LV is lying on the boundary LB which means that the end node E which is the boundary LB is reached. Thus, the trimming path [(RV,I0) (I0,LV)] for the gap on the face F has been found.

As in this case the routine produces a valid trimming path without the need of backtracking. However, since the sorting is basically a local decision, a check has to be carried out for the global validity at every level (step S816). For instance, the simplified example illustrated in FIG. 7 is considered again. It is supposed that the point I1 (see FIG. 7c) was chosen as the "best one" during the sorting of the child nodes. The next consideration would lead the segment (I1,I3) and the final one of the segments would be (I3,V). At this point there was however generated a self-intersecting path. This is detected by a validity check (step S816) and in case the solution is not valid, it is rejected. In this case, a back track operation is carried out and the sub-routine proceeds at point I5 and at corresponding face F5 and finally ends up with the correct solution.

This example also illustrates the benefit of the separation of the creation of the geometry and the creation of the topology. If segments (RV,I1) and (I1,I3) had been integrated right after their creation, it would have been necessary to re-create the initial state of the body in order to further explore segments (RV,I5) The inverse of topological operations is in general however not unique, meaning that there are several initial bodies which could have lead to the current state. This non-uniqueness would prohibit the back tracking of the search routine. To avoid this, the validity check (step S816) performs two important tests: The first one is to check for self-intersections of the trimming path, and the second one is check for intersections of the path with existing edges.

Wherever the check detects an invalid partial path, the last node is removed and the routine is back tracked. By this way, a trimming path can be generated which guarantees a global consistent body. Only when the entire trimming path for a gap is known, the second sub-routine O3 is triggered by the general routine. The sub-routine O3 then integrates a path topologically to the model.

In the following the sub-routine O3 integrating the trimming path and marking new gaps will be described in more detail with reference to FIG. 11.

At step S1101 the sub-routine O3 is entered from the general routine. The input for the sub-routine O3 is the body or the object having the hole or gap and the trimming path T for the face F. At step S1102 the start node F of the trimming path T is set to be the current segment and the edge of the start node S is set to be the current edge. At step S1104 the segment which follows the current segment is determined. This segment is referred to as the successor Si of the current segment. At step S1106 it is determined whether the successor is the end node E of the trimming path T. If this is the case, the sub-routine O3 will be left at step S1108 and will return to the general routine. The output of the sub-routine O3 is the body 200 with integrated trimming path T.

If it is determined at step S1106 that the successor is not the end node of the trimming path, the end vertex of the current edge will be set to be the current vertex at step S1110. At step S1112 the face Fi corresponding to the successor Si is determined and at step S1114 a counterclockwise rotation around current vertex is carried out until the edge ei of the face Fi is reached. At step S1116, it is determined as to whether the successor segment Si intersects an original edge e-int of the face Fi which is also referred to as the secondary face. If this is the case all edges between the edge ei and the e-int will be killed at step S1118 and the sub-routine will continue at step S1120. If it is determined at step S1116 that the segment Si does not intersect the edge e-int, the face Fi will be marked as growing at step S1122. The sub-routine then continues at step S1120. At this step a new edge e-new between the face F having the gap and the secondary face Fi is created. At step S1122 all edges between the current edge and the edge ei are attached to the start vertex of the new edge e-new. At step S1124 the remaining edges around the current vertex are attached to the end vertex of the new edge e-new and at step S1126 the current segment is set to be the successor segment Si and the current edge is set to be the new edge e-new. The sub-routine returns to step S1104.

Figure 12A:
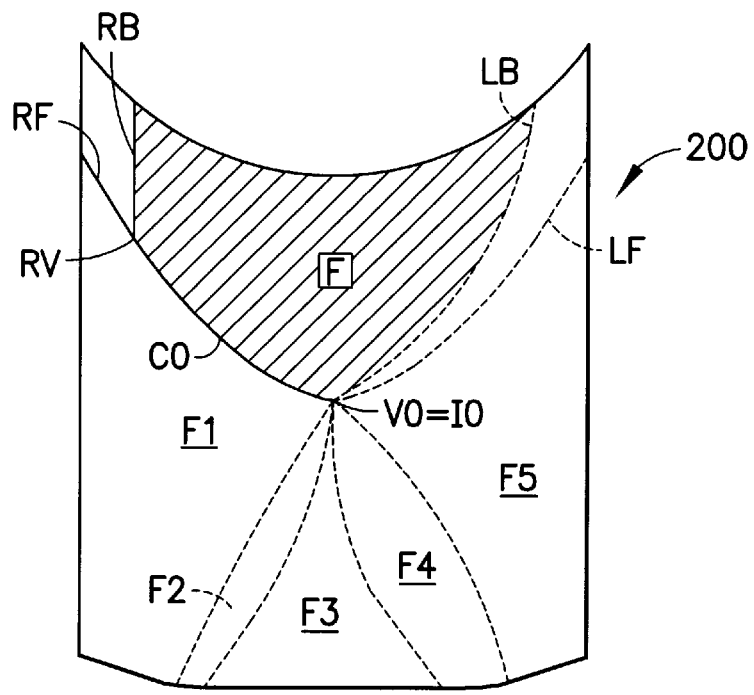
FIGS. 12a–b illustrate the integration of the trimming path of face F.
Figure 12B:
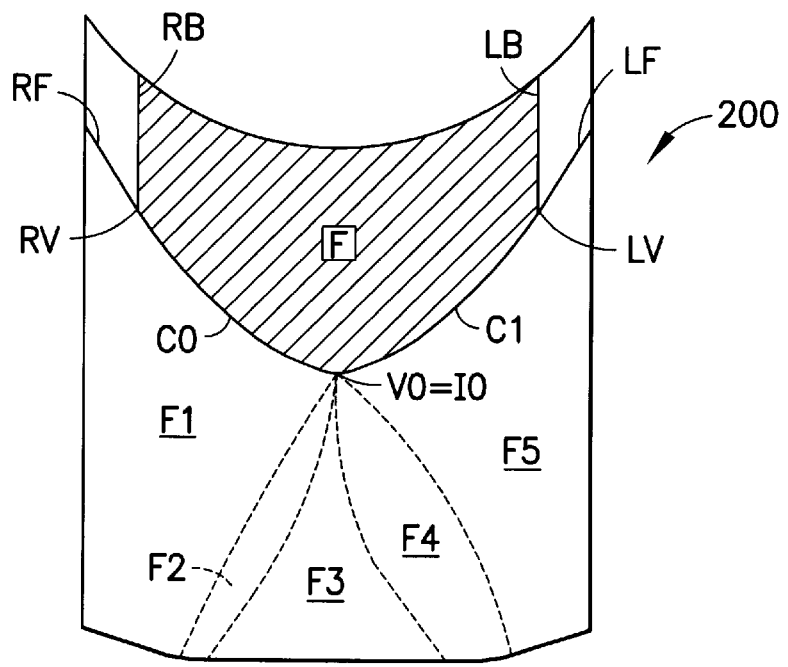

With reference to FIG. 12, a preferred embodiment of the integration of the trimming path is described in more detail. The trimming path basically consists of geometric information, namely the curve segments closing a given gap. In addition, information is provided concerning the integration of the path. For every curve segment a new edge must be created between the primary face F and the secondary face. As it is illustrated in FIG. 12a, this means that for the segment (RV,I0) there will be a new edge between face F and face F1 and for the segment (I0,LV) a new edge between face F and face F5 is to be created (see FIG. 12b). When integrating the path for the face F, the initial current edge is the edge RB and the successor segment of the start node S is the segment Si which is the segment (RV,I0) (steps S1102 and S1104). The edge corresponding to the secondary face Fi is the edge LN. If the new segment Si intersects an existing edge e-int, the secondary face Fi will shrink. In this case, all edges between the edge ei which is the edge LN and the intersected edge e-int are to be removed (steps S1116 and S1118). The integration is more complicated when no such intersection point exists. From the fact that the path does not leave the face F1 through an original edge, it is clear that the face F1 will grow. Therefore, the face F1 is marked for further processing in the step O4 of the general routine (see FIG. 3).

Now a new edge e-new which is the edge C0 in FIG. 12a between faces F and F1 is created and all edges between RB and RN (counter-clockwise) are attached to the start vertex of the new edge C0, wherein the remaining edges are attached to the end vertex of the new edge C0 (steps S1120 to S1124). FIG. 12a illustrates the resulting body.

Figure 11A:
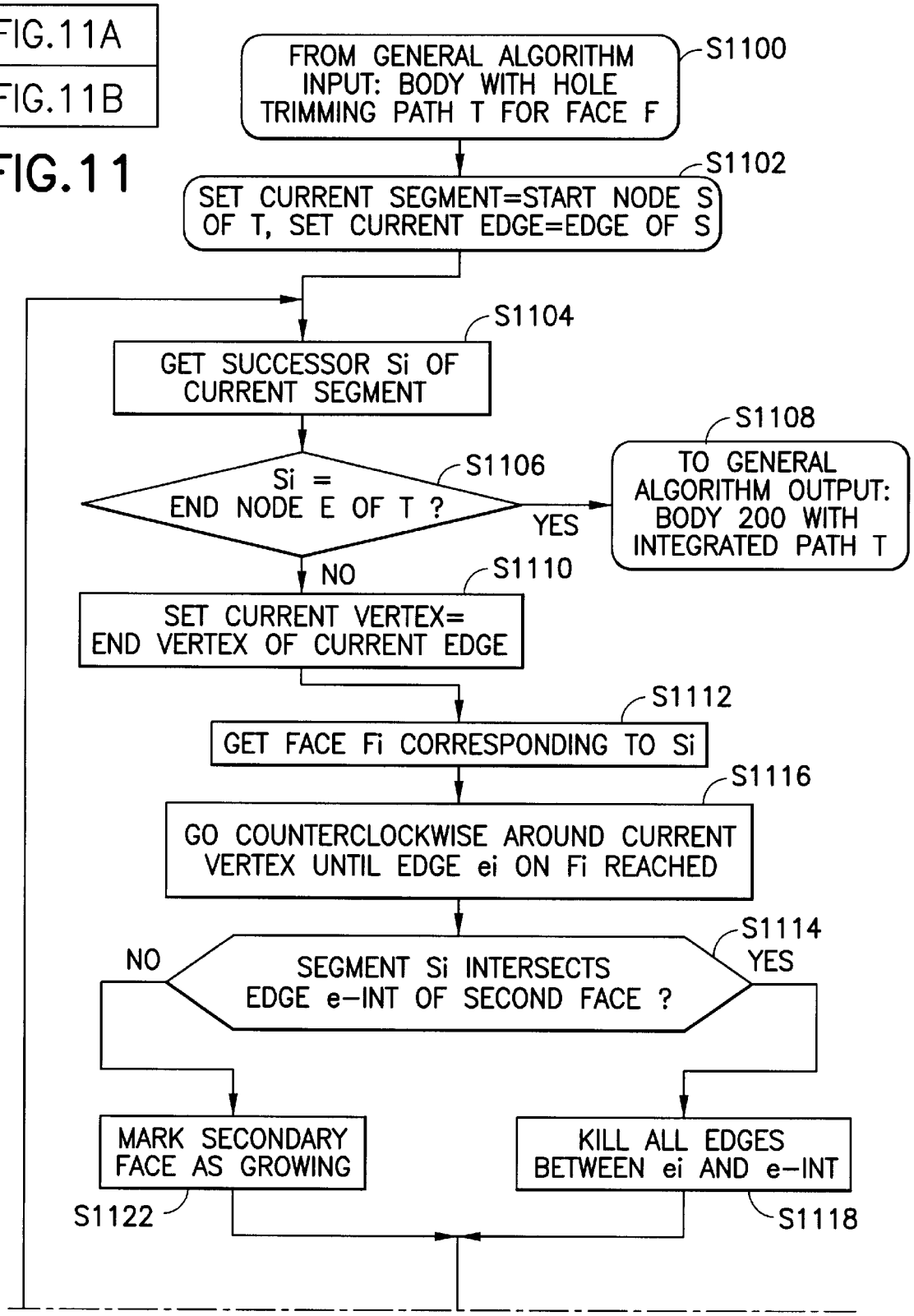
FIG. 11 is a flow chart of the routine for integrating a trimming path.
Figure 11B:
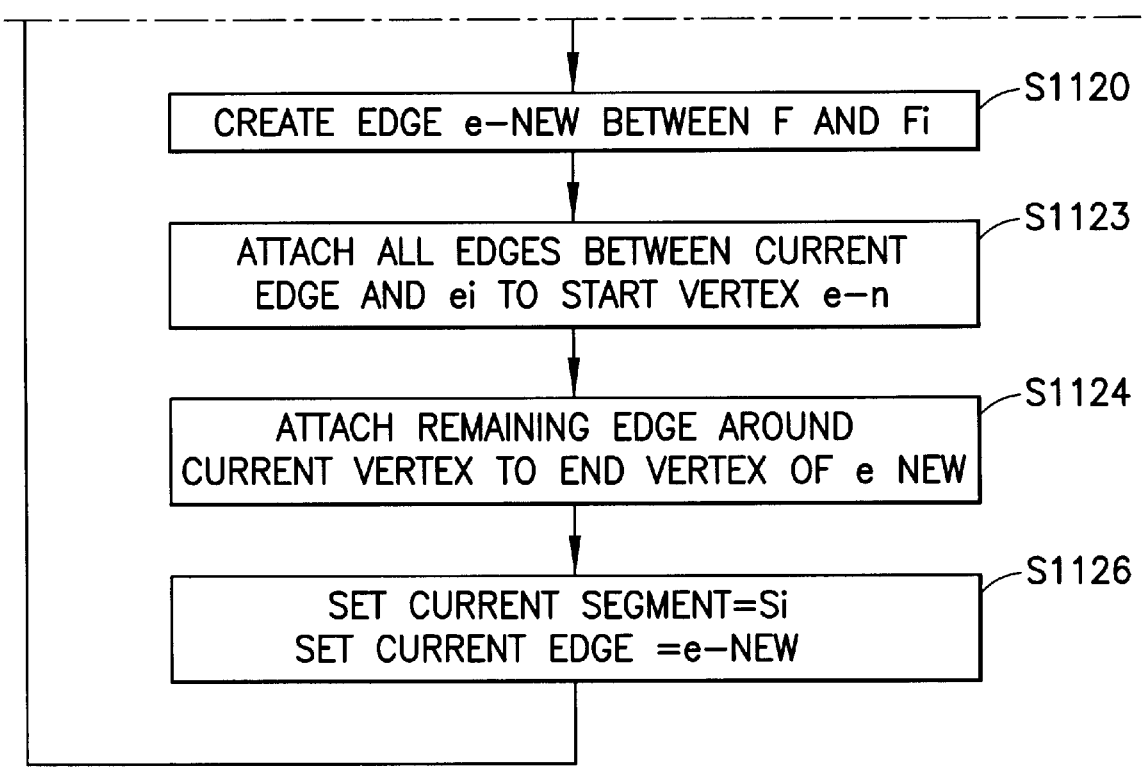

In the second iteration of the loop of the sub-routine O3 shown in FIG. 11, the segment (I0,IV) is integrated. The corresponding face is face F5 and consequently the new edge e-new is the edge E1 between face F and F5. All edges between the current edge C0 and the one lying on face F5, namely edge R4, are attached to the start vertex of edge C1 as it is shown in FIG. 12b. The successor of the segment (I0,LV) of the trimming path is the end node which is the point LV. Therefore, the integration of the path for face F is complete. It is noted that all edges around the face F are now geometrically and topologically consistent and therefore are shown in solid lines. Since the face F1 was marked in this iteration of a sub-routine O3, the step O4 of the general routine collects this face and triggers the calculation and integration of trimming path of face F1.

Figure 13:
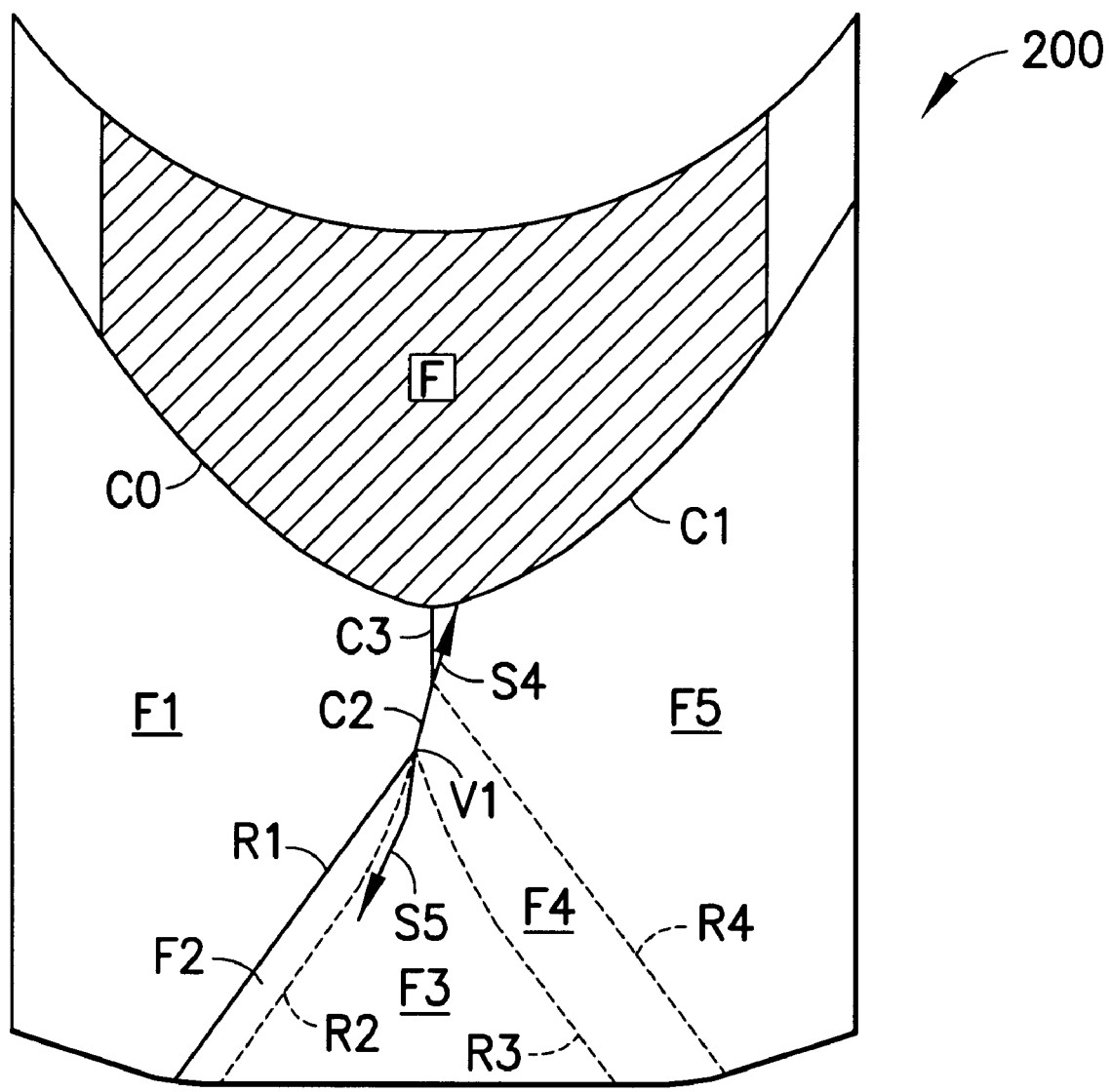
FIG. 13 illustrates the trimming path for face F1.

The calculation of trimming paths and integration of the trimming paths for the face F1 will now be described with reference to FIG. 13.

The calculation of the trimming path on face F1 starts with the general preprocessing step (step S802) for finding the end points of the start node S and the end node E. In the embodiment described with reference to FIG. 13, the start node is the edge R1 and the end node is the edge C0. The end point of edge C0 is already correct because it is geometrically correctly connected with neighbouring edge C1. The edge R1 however does not fit to any of its topologically adjacent edges. Intuitively, the edge is too short as will become clear from a comparison of the extent of the edge in the original body as it is shown in FIG. 2a. To find the end point, a "ray-shooting" technique is used. The edge R1 can be viewed as a semi-infinite ray. To find the point V1 which is the end point of the edge R1, this ray is intersected with all open faces attached to its end vertex and the first intersection point which makes RI the shortest yields the end point V1. It is noted that by using this "ray-shooting" technique, the end points of the curve segments S and E are also determined during the above described preprocessing step (step S802) of the sub-routine O2.

With respect to the edge R1, the ray-shooting technique is carried out as follows. The edge R1 is intersected with all open faces around its end vertex, namely with faces F3, F4 and F5. The intersection point which makes R1 the shortest is the new end point of the edge R1. In this case, it is the intersection point V1 with the face F4 as it is shown in FIG. 13. The extension of the edge R1 has two consequences. Firstly, the adjacent face, namely face F2, must be marked as growing because one of its original edges, namely edge R1, grows. Secondly, it has to be checked whether a gap has already been closed by the extension of edge R1. This is not the case and therefore the steps following step S804 of the sub-routine O2 are carried out.

Firstly, all intersection curves between face F1 and the face which the edge R1 intersects, namely face F4, are computed (step S902). This yields the semi-curve S4 pointing upward from vertex V1 and the semi-curve S5 pointing downward from vertex V1 (step S904). Now the intersection points of the semi-curves S4 and S5 with the edges of face F4 are determined (step S908). Since there are no points inside existing edges of face F4, new curve segments for the semi-curves S4 and S5 are constructed by the ray-shooting approach (steps S910 and S912). The sorting of the semi-curves S4 and S5 establishes the order {S4,S5} because the angle between S4 and the edge R1 is smaller than the one between the semi-curve S5 and the edge 01. The subsequent sorting of the curve segments establishes the order {(V1, V2), . . . remaining segments on semi-curve S4, . . . segments on semi-curve S5 . . . }. Since vertex V2 is the intersection of (V1, V2) with face F5, the next segments are on intersection curves between faces F1 and F2. After creating all possible curve segments and sorting those, the "best segment" (V2, V0) is found. This segment intersects the edge C1 exactly at its end point.

Figure 14A:
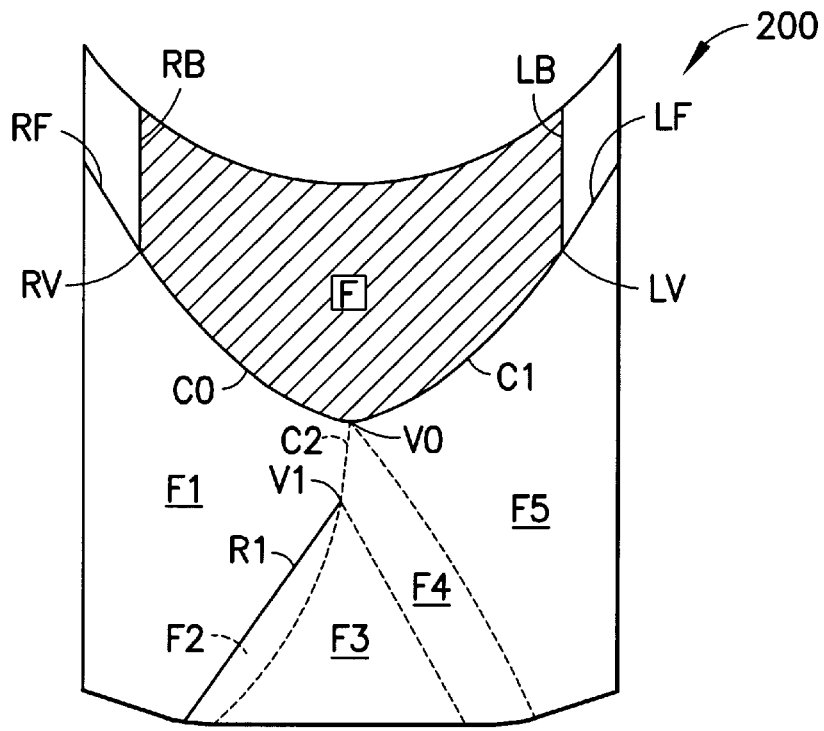
FIGS. 14a–b illustrate the integration of the trimming path of face F1.
Figure 14B:
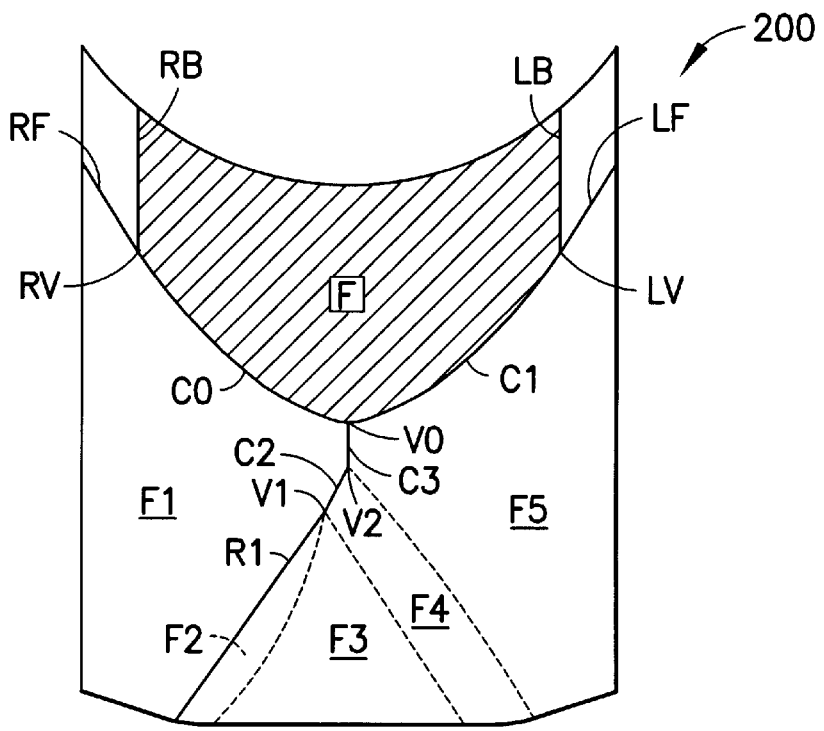

With reference to FIG. 14, the integration of the trimming path of the face V1 is now described. Integration of the trimming path [(V1,V2)(V2,V0)] is illustrated in FIG. 14a and FIG. 14b. Firstly the edge C2 between face F1 and face F4 is created. All edges between edge R1 and the first edge on face F4, the edge R3, remain attached to the start vertex V0 of the edge C2. The remaining edge R4 moves to the end of edge C2. Since there was no intersection inside an edge of face F4, this face is marked as growing. In the second iteration, the edge C3 is created. However, in this case there was an intersection point with edge C1, the vertex V0. Therefore, face F5 does not need to be marked. Moreover, since there are no edges between edges R4 and C2, no edges need to be removed.

Figure 15:
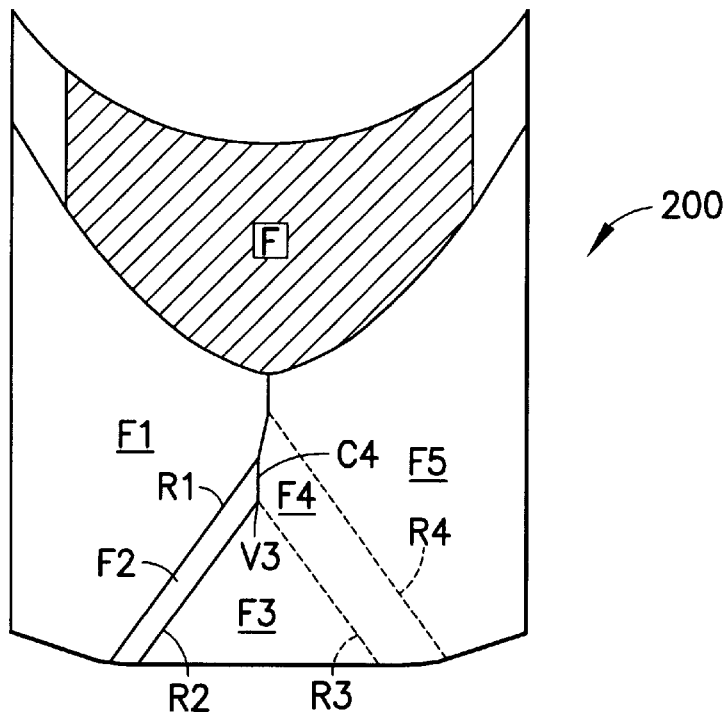
FIG. 15 illustrates the trimming path for face F2.

With reference to FIG. 15, the calculation and integration of the trimming path of face F2 which has been marked by the sub-routine O3 will be described. The calculation of the trimming path of face F2 consists of the preprocessing step (step S802) which yields the end point V3 of edge R2. Since the edge R2 was extended in the preprocessing step, the face F3 is marked as growing. The integration of the trimming path (V3,V2) is quite simple. The new edge C4 is created and the body as illustrated in FIG. 15 is achieved. This body already has the topology, however, gaps on faces F3 to F5 are still open because the original edges R3 and R4 are still too short.

Figure 16:
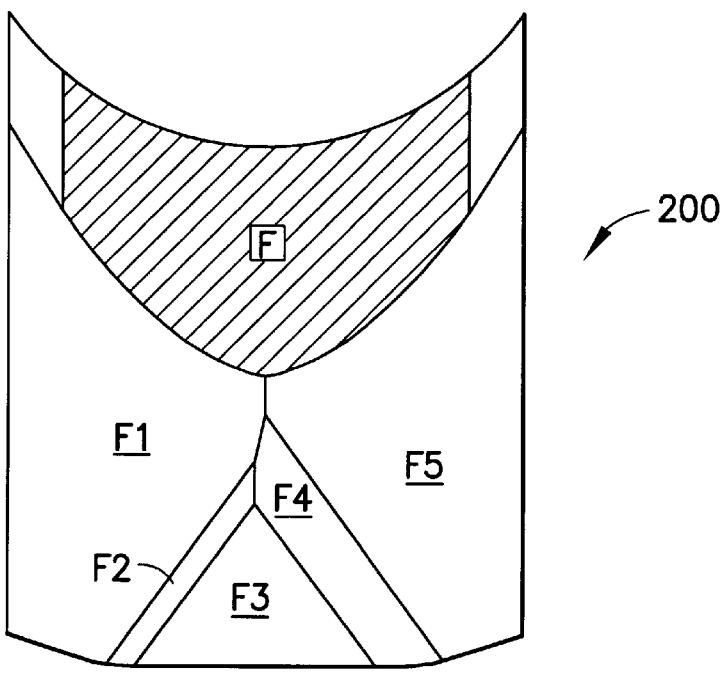
FIG. 16 illustrates the trimming paths for the faces F3 to F5.

With reference to FIG. 16, the handling of the remaining gaps on faces F3, F4 and F5 is described. The gaps on faces F3 and F4 only require the preprocessing step S802. In both cases, the edges of the start nodes are extended by the preprocessing step. The extension already closes the corresponding gaps and the iteration loop is never entered.

It is noted that the face F5 is never marked as a growing one. The trimming path computed and integrated as by-product of closing the gap on faces F and F1 to F4.

FIG. 17 shows the resulting body which is achieved by applying the method of the present invention to the body shown in FIG. 2a. FIG. 17 shows the body 200 into which the blend surface F has been integrated by means of the above described method. As can be seen from FIG. 17 all new vertices and new edges created by means of the method of the present invention are indicated in FIG. 17. The method according to the present invention enables the reliable handling of the complicated operation of trimming topology to finite portions of the underlying geometry. This is achieved by determining the points and curves about a finite region of every face around a pole and by creating the topology corresponding to the trimming sequences such that a manifold solid body is achieved.

The method according to the present invention has the capability of existing methods to provide a general solution, in particular it is possible to detect and handle situations where adjacent topologies are swallowed by the blend surface.

Important features of the method of the present invention are the following:

Trimming of every face without regard to the remaining open faces, wherein the calculation of the trimming path and the topological integration into the body can be done while still having other open faces in the model. In particular, this allows to handle several blends simultaneously.

Detection of additional gaps while trimming a given one. That is the gaps on secondary, namely non-blend faces, are recorded while trimming the primary gaps. By this way, no distinction between shrinking and growing adjacent faces is necessary. Shrinking adjacent faces are trimmed as a "side-effect" of handling the primary faces while growing faces are extracted for further processing.

Separation of the determination of the trimming path geometry and the topological integration. Unlike prior art methods, the method according to the present invention firstly computes the entire trimming path required to close a gap and then integrates it in the body. This allows to use a certain routine for the determination of the sequence of curve segments. The integration of a partial trimming path into the body before it is complete would prohibit back tracking of the search routine because the inversion of topological modifications is usually not unique.

A powerful sub-routine for determining the trimming path, the trimming path is found by a search routine powerful enough to find a solution even if several surrounding faces are open. Moreover, this routine detects situations where adjacent topologies shrink or vanish entirely.

A sub-routine which performs the topological modification is necessary to integrate the trimming path. In particular, this process both handles growing adjacent topologies and performs an actual removal of topological elements being swallowed by another face.

Although the above described preferred embodiment of the method according to the present invention has been made with reference to a body in which only one blend surface is to be integrated, it has to be pointed out that the method according to the present invention is also capable of simultaneously integrating a plurality of blend surfaces of a complex body, as will be described in the following with reference to FIG. 18.

In FIG. 18a a complex body 1800 is shown. This body comprises a plurality of faces A to I. The edges to be blended simultaneously are labelled e1, e2 and e3. FIG. 18b and FIG. 18c show two possible configurations of the body 1800 after the edges e1 to e3 have been blended. In both cases the edges e1 to e3 are replaced by blend surfaces F1 to F3, the integration of which into the object 1800 results in that new topologies are created. As can be best seen from FIG. 18c, the original faces B and H grow and actually become one common face.

Figure 19:
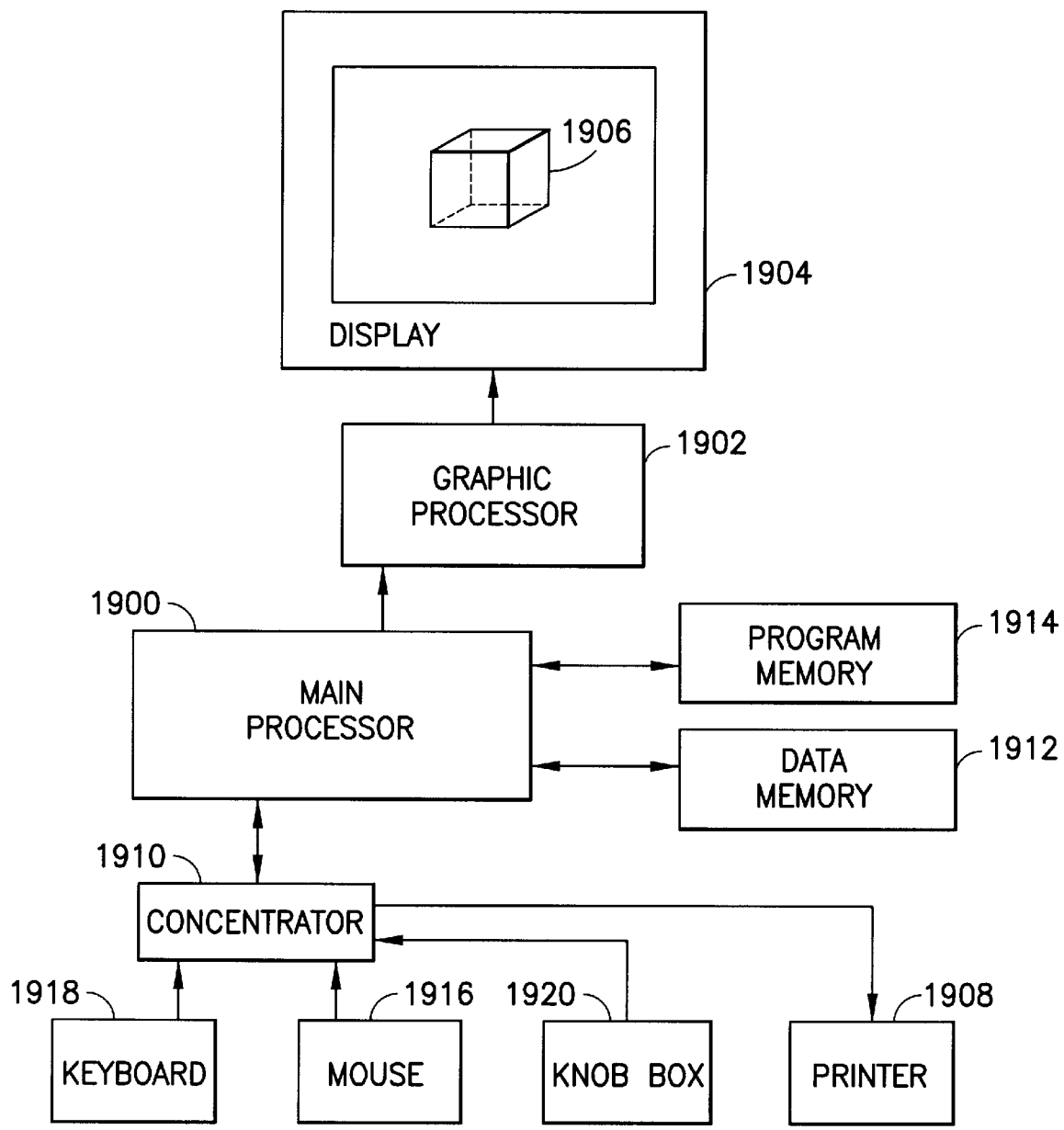
FIG. 19 schematically shows the components of a 3D-CAD system incorporating the present invention.
Figure 20A:
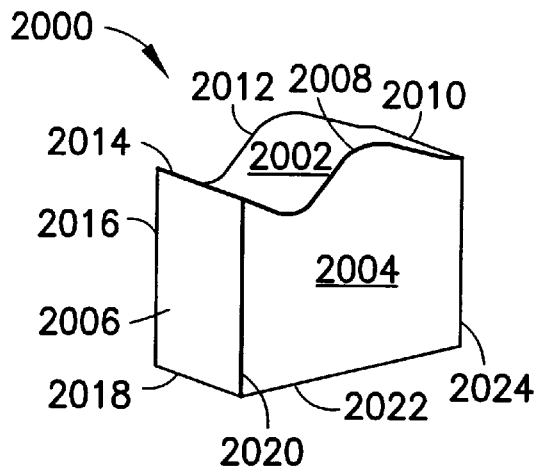
FIGS. 20a–c illustrate the object which results after the application of a constant and a variable radius blend operation.
Figure 20B:
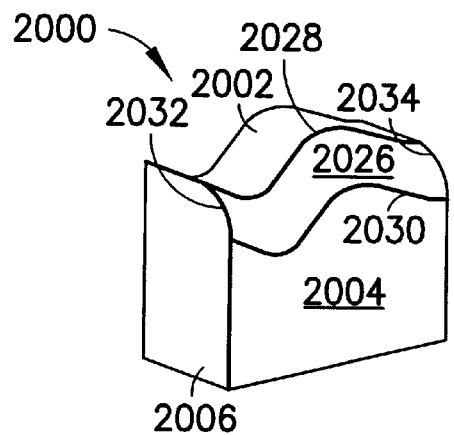
Figure 20C:
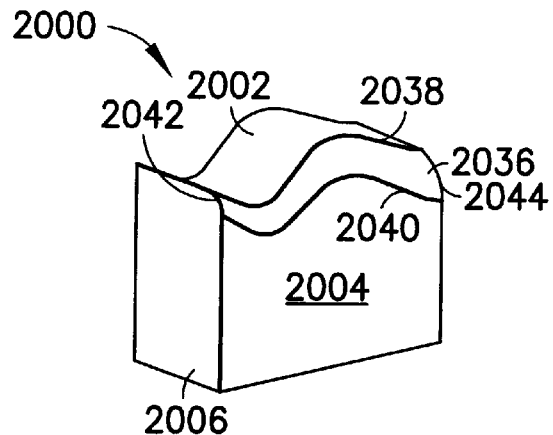
Figure 21A:
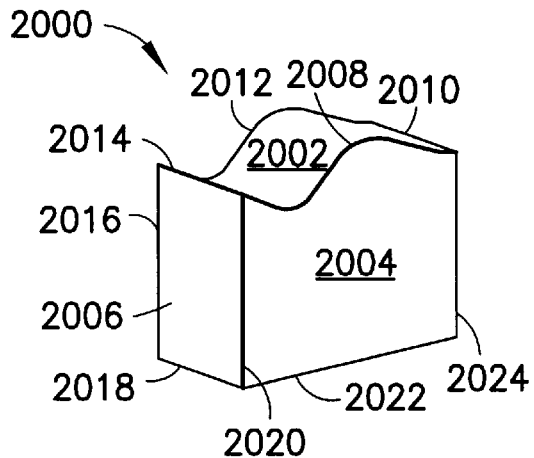
FIGS. 21a–c illustrates the resulting object after the application of a constant distance and a constant distance/angle chamfer operation.
Figure 21B:
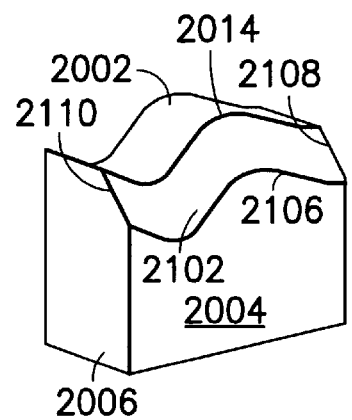
Figure 21C:
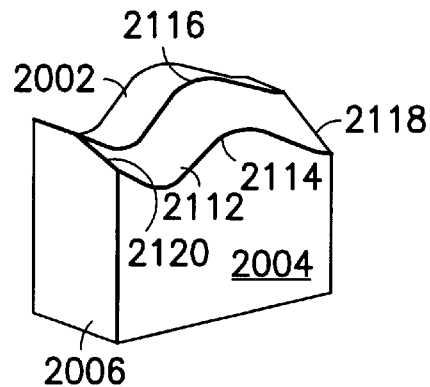
Figure 22A:
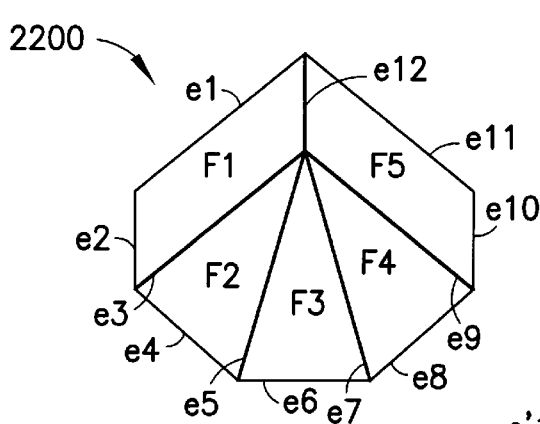
FIGS. 22a–c illustrates the integration of a blend surface which results in shrinking adjacent faces.
Figure 22B:
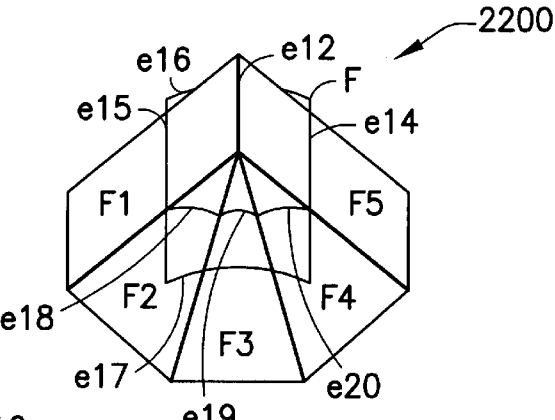
Figure 22C:
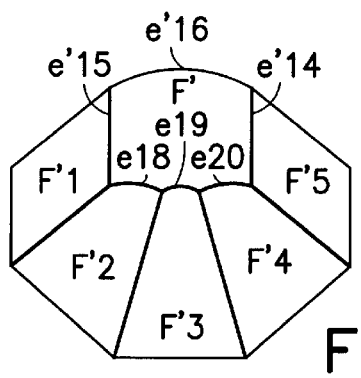
Figure 23A:
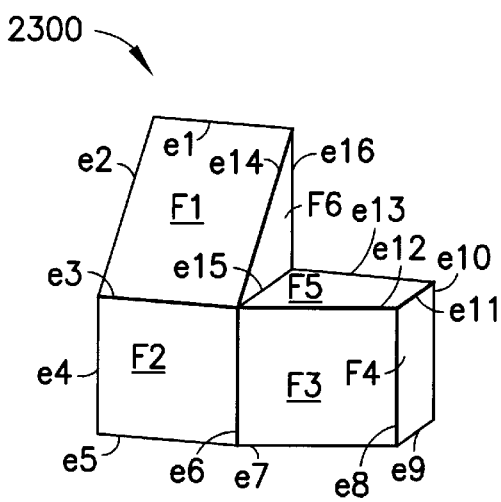
FIGS. 23a–c illustrates the integration of a blend surface which results in growing adjacent faces.
Figure 23B:
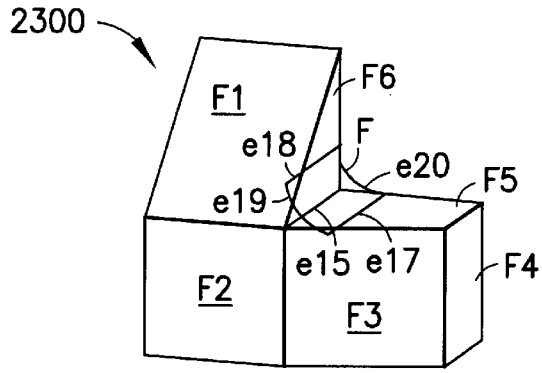
Figure 23C:
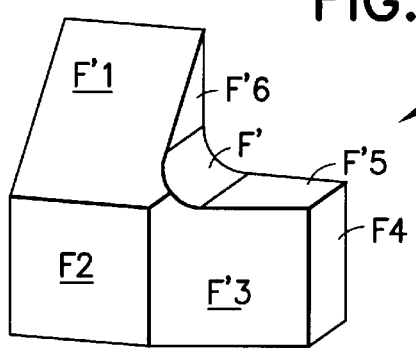

Reference is now made to FIG. 19 which is a schematic diagram showing the typical components of a 3D-CAD system which is suited for carrying out the method according to the present invention. A main processor 1900 is connected via a graphic sensor 1902 to a display screen 1904, for example a CRT. The geometric object 1906 under design is displayed on the screen 1904. The main processor 1900 performs the calculations for creating and modifying the geometric object displayed on the screen 1904. A printer 1908 is connected via a concentrator 1910 to the main processor 1900. The printer can produce a hard copy of the image displayed on the screen or a hard copy of geometric objects stored in the data memory 1912 of the CAD system. The data memory 1912 is connected to the main processor and comprises a mass storage device such as a magnetic or an optical disc. A program memory 1914 contains instructions which are used for the creation and the calculation of the geometric object under design.

There are several input means which are available for the user for interaction with the CAD system. In the embodiment shown, there is a computer mouse 1916 which controls a cursor displayed on the screen. Also displayed on the screen is a command menu which the user may select desired commands by positioning the cursor displayed on the screen. Also displayed on the screen is a command menu from which the user may select desired commands by positioning the cursor at the displayed object by appropriate movement of the mouse and by pressing an activation key. An example of a displayed menu option is the degradation of a blend surface into the object displayed on the screen. In addition to the mouse, a keyboard 1918 is provided for entering commands or data into the processor. A further input means is a knob box 1920 which comprises a plurality of knobs by means of which the object displayed can be rotated around various axes and linear shifts to specific directions. When the user selects the option of integrating a blend chamfer surface into a body for replacing a specific patch, the steps of the present invention as described above are carried out by means of the main processor 1900, wherein the method is resident in the program memory 1914.

What is claimed is:

1. A computer implemented method of integrating a blend or chamfer surface replacing an edge of a geometrical body, into a solid model of the body in a computer-aided design system wherein the solid model is representative of a device to be produced and wherein curve segments are a portion of intersection curves of a face having a gap and surrounding faces, the method comprising the steps of:
   a) defining a primary blend or chamfer surface for said solid model;
   b) calculating primary boundaries between the primary surface and the body;
   c) trimming the primary boundaries;
   d) removing edges adjacent to the edge to be replaced if said edges are determined to be obsolete, thus leaving the body in a geometrically inconsistent state;
   e) creating a new primary blend or chamfer face based on the primary surface by substituting the edge to be removed by new edges forming a new boundary of the new primary face;
   f) for each vertex of the edge to be removed, checking whether the body is geometrically inconsistent around said vertex, if so, trimming the topology of the body around said vertex and carrying out the following steps:
   g) collecting all gaps on the new primary face, a gap being defined by topologically adjacent edges which do not fit geometrically; and
      for each gap:
   h) calculating a trimming path consisting of a sequence of cross segments trimming a part of the face, said calculating comprising the following substeps:
      h1) defining a start node at which the trimming path of the face having the gap starts and an end node at which the trimming path of the face having the gap ends wherein a node is a curve segment of the trimming path;
      h2) calculating an end point of the start node and an end point of the end node;
      h3) creating the child nodes for a current node by
         h3.1) defining the start point of the current node and the current face;
         h3.2) intersecting the face with the current face;
         h3.3) determining all curves created by step h3.2) which contain the end point;
         h3.4) creating semi-curves for each curve determined in step h3.3) wherein a semi-curve is one of two semi-infinite segments of each curve, each segment starting in the end point and having opposite directions;
         h3.5) intersecting each created semi-curve with the edge of the current face;
         h3.6) if an intersection point inside the edges of the current face exists, creating one child node for the intersection point;
         h3.7) if an intersection point inside the edges of the current face does not exist, carrying out the following steps:
            h3.7.1) intersecting the semi-curve with open faces around said vertex thus defining one or more intersection points;
            h3.7.2) creating a child node for each intersection point defined in step h3.7.1; and
         h3.8) outputting a list of the created child nodes.
      h4) sorting the child nodes created in step h3; and
      h5) repeating steps h3) and h4) for all nodes starting with the start node until the end node is reached;
   i) creating a new topology closing the gap based on the trimming path calculated by step h);
   k) collecting all gaps on secondary, non-blend or non-chamfer faces around said vertex;
   l) repeating steps h) and i) for the gaps collected in step k) for all secondary faces of the body; and
   m) displaying said solid model of said body.

2. The method according to claim 1, wherein step c) comprises the following steps:
   c1) calculating an intersection point between the primary boundaries and the edges of the faces adjacent to the edge to be replaced; and
   c2) marking those edges of the faces adjacent to the edge to be replaced which do not have any of the intersection point calculated in step c1).

3. The method according to claim 2, wherein step d) comprises the following steps:
   d1) removing the edges which were marked in step c2; and
   d2) pulling the edges of the body which prior to step d1) had an intersection point with the marked edges toward the vertex of the edge to be replaced, wherein the edges having said intersection point with the primary boundaries are pulled such that the vertex and the respective intersection point are connected.

4. The method according to claim 3, wherein the edges are removed by applying the Euler operator KEV to the model.

5. The method according to claim 1, wherein the new primary face is created by applying the Euler operator ADEF to the model.

6. The method according to claim 1, wherein step g) comprises the following steps which are carried out for all faces of the body:
   g1) selecting a face which has not yet been processed;
   g2) determining whether the selected face is the new primary face;

g3) if step g2) yields that the selected face is the new primary face, determining whether the selected face contains said vertex;

g4) if step g3) yields that the selected face contains said vertex, getting an edge starting in said vertex and getting an edge ending in said vertex;

g5) determining whether the end points of the edges got in step g4) are different; and g6) if step g5) yields that the end points are different, adding the selected face to a list containing all selected faces having a gap.

7. A computer implemented method of integrating a blend or chamfer surface replacing an edge of a geometrical body, into a solid model of the body in a computer-aided design system wherein the solid model is representative of a device to be produced and wherein curve segments are a portion of intersection curves of a face having a gap and surrounding faces, the method comprising the steps of:

a) defining a primary blend or chamfer surface for said solid model;

b) calculating primary boundaries between the primary surface and the body;

c) trimming the primary boundaries;

d) removing edges adjacent to the edge to be replaced if said edges are determined to be obsolete, thus leaving the body in a geometrically inconsistent state;

e) creating a new primary blend or chamfer face based on the primary surface by substituting the edge to be removed by new edges forming a new boundary of the new primary face;

f) for each vertex of the edge to be removed, checking whether the body is geometrically inconsistent around said vertex, if so, trimming the topology of the body around said vertex and carrying out the following steps:

g) collecting all gaps on the new primary face, a gap being defined by topologically adjacent edges which do not fit geometrically; and for each gap:

h) calculating a trimming path consisting of a sequence of cross segments trimming a part of the face, said calculating comprising the following substeps:

h1) defining a start node at which the trimming path of the face having the gap starts and an end node at which the trimming path of the face having the gap ends wherein a node is a curve segment of the trimming path;

h2) calculating an end point of the start node and an end point of the end node;

h3) creating the child nodes for a current node;

h4) sorting the child nodes created in step h3 by h4.1) assigning a value to each semi-curve, wherein the value is based on an angle between a parent node and a respective semi-curve;

h4.2) determining the semi-curve with the smallest angle and assigning the highest priority to same; and h4.3) determining the shortest curve-segment of the semi-curve having the highest priority.

h5) repeating steps h3) and h4) for all nodes starting with the start node until the end node is reached;

i) creating a new topology closing the gap based on the trimming path calculated by step h);

k) collecting all gaps on secondary, non-blend or non-chamfer faces around said vertex;

l) repeating steps h) and i) for the gaps collected in step k) for all secondary faces of the body; and m) displaying said solid model of said body.

8. The method according to claim 1, wherein step i) creates a new edge between a first face having the gap and second face adjacent to the first face by carrying out the following steps:

i1) defining the start node of the trimming path for the first face as the current segment;

i2) defining the edge of the start no de as the current edge;

i3) determining the next segment successing the current segment;

i4) determining the present edge of the second face corresponding to the next segment;

i5) evaluating whether the next segment intersects with an original edge of the second face;

i5.1) if there is an intersection, removing all edges between the present edge and the original edge of the second face;

i5.2) if there is no intersection, marking the second face as growing and as having a gap;

i6) creating a new edge between the first face and the second face;

i7) pulling all edges between the current edge and the present edge to the start vertex of the new edge;

i8) pulling the remaining edges around the current vertex to the end vertex of the new edge;

i9) defining the next segment as current segment;

i10) defining the new edge as current edge; and i11) repeating steps i3) to i10) until it is determined that the next segment is the end node of the trimming path.

9. The method according to claim 1, wherein step k) comprises the following steps which are carried out for all faces of the body:

k1) selecting a face which has not yet been processed;

k2) determining whether the selected face contains the vertex;

k3) if step k2) yields that the selected face contains said vertex, getting an edge starting in said vertex and getting an edge ending in said vertex;

k4) determining whether the end points of the edges got in step k3) are different; and k5) if step k4) yields that the new end points are different, adding the selected face to the list containing all selected faces having a gap.

* * * * *